(12) United States Patent
Byrne et al.

(10) Patent No.: US 11,018,487 B2
(45) Date of Patent: May 25, 2021

(54) OVERHEAD ELECTRICAL INFEED

(71) Applicants: Norman R. Byrne, Ada, MI (US); Joseph D. Ward, Grand Rapids, MI (US); Shane Rogers, Rockford, MI (US); Beth L. Kolomyjec, Fenwick, MI (US)

(72) Inventors: Norman R. Byrne, Ada, MI (US); Joseph D. Ward, Grand Rapids, MI (US); Shane Rogers, Rockford, MI (US); Beth L. Kolomyjec, Fenwick, MI (US)

( * ) Notice: Subject to any disclaimer, the term of this patent is extended or adjusted under 35 U.S.C. 154(b) by 0 days.

(21) Appl. No.: 16/747,120

(22) Filed: Jan. 20, 2020

(65) Prior Publication Data

US 2020/0153221 A1 May 14, 2020

Related U.S. Application Data

(63) Continuation-in-part of application No. 16/253,001, filed on Jan. 21, 2019.

(Continued)

(51) Int. Cl.
*H02G 7/05* (2006.01)
*F21V 23/06* (2006.01)
(Continued)

(52) U.S. Cl.
CPC ............ *H02G 7/05* (2013.01); *F16M 13/022* (2013.01); *F16M 13/027* (2013.01); *F21V 23/06* (2013.01);
(Continued)

(58) Field of Classification Search
CPC ...... H02G 7/05; H02G 3/0456; F16M 13/022; F16M 13/027; F16M 11/046; F16M 2200/047; F21V 23/06; F21Y 2103/00
(Continued)

(56) References Cited

U.S. PATENT DOCUMENTS

| 412,713 A | * | 10/1889 | Sayers | H02G 11/02 |
| | | | | 191/12.2 R |
| 910,112 A | * | 1/1909 | Carter | A61B 6/105 |
| | | | | 248/331 |

(Continued)

OTHER PUBLICATIONS

Images of various overhead lighting and power arrangements, all published on the Internet on or before May 24, 2018.

*Primary Examiner* — Timothy J Thompson
*Assistant Examiner* — Michael F McAllister
(74) *Attorney, Agent, or Firm* — Gardner, Linn, Burkhart & Ondersma LLP

(57) ABSTRACT

An overhead electrical infeed system includes an overhead mount surface, an electrical cord coupled to the overhead mount surface, an electrical outlet assembly coupled to a distal end portion of the cord having a proximal end portion mounted to the overhead mount surface and a distal end portion spaced from the proximal end portion. At least a portion of the weight of the electrical outlet assembly is supported by the electrical cord. A retractor is positioned along the electrical cord and is operable to raise the electrical outlet assembly or to retain the electrical outlet assembly at a selected elevation. An electrical outlet is electrically energized by the electrical cord and is mounted to the electrical outlet assembly, to provide users with access to electrical or data signals.

19 Claims, 28 Drawing Sheets

Related U.S. Application Data

(60) Provisional application No. 62/794,524, filed on Jan. 18, 2019, provisional application No. 62/619,233, filed on Jan. 19, 2018, provisional application No. 62/683,615, filed on Jun. 11, 2018.

(51) Int. Cl.
  *H02G 3/04* (2006.01)
  *F16M 13/02* (2006.01)
  *F21Y 103/00* (2016.01)
  *F16M 11/04* (2006.01)

(52) U.S. Cl.
  CPC ......... *H02G 3/0456* (2013.01); *F16M 11/046* (2013.01); *F16M 2200/047* (2013.01); *F21Y 2103/00* (2013.01)

(58) Field of Classification Search
  USPC ...................................................... 174/70 R
  See application file for complete search history.

(56) References Cited

U.S. PATENT DOCUMENTS

| | | | | |
|---|---|---|---|---|
| 3,711,021 | A | * | 1/1973 | Tantillo .................. A47F 5/0892 248/579 |
| 3,763,368 | A | * | 10/1973 | Baggott .................. F21V 21/16 362/401 |
| 4,316,238 | A | * | 2/1982 | Booty ..................... F21V 21/38 362/147 |
| 4,350,850 | A | * | 9/1982 | Kovacik ................ H02G 11/02 191/12.2 R |
| 9,220,342 | B2 | | 12/2015 | Byrne et al. |
| D761,732 | S | | 7/2016 | Byrne et al. |
| 9,457,674 | B2 | * | 10/2016 | Bianco ................... B60L 53/16 |
| 10,381,808 | B2 | | 8/2019 | Byrne et al. |
| 2003/0193810 | A1 | * | 10/2003 | Patz ....................... F21S 8/065 362/387 |
| 2014/0284160 | A1 | * | 9/2014 | Towe ..................... H02G 11/02 191/12.2 R |
| 2019/0006833 | A1 | * | 1/2019 | Hall ....................... G05B 15/02 |
| 2019/0229511 | A1 | | 7/2019 | Byrne et al. |

\* cited by examiner

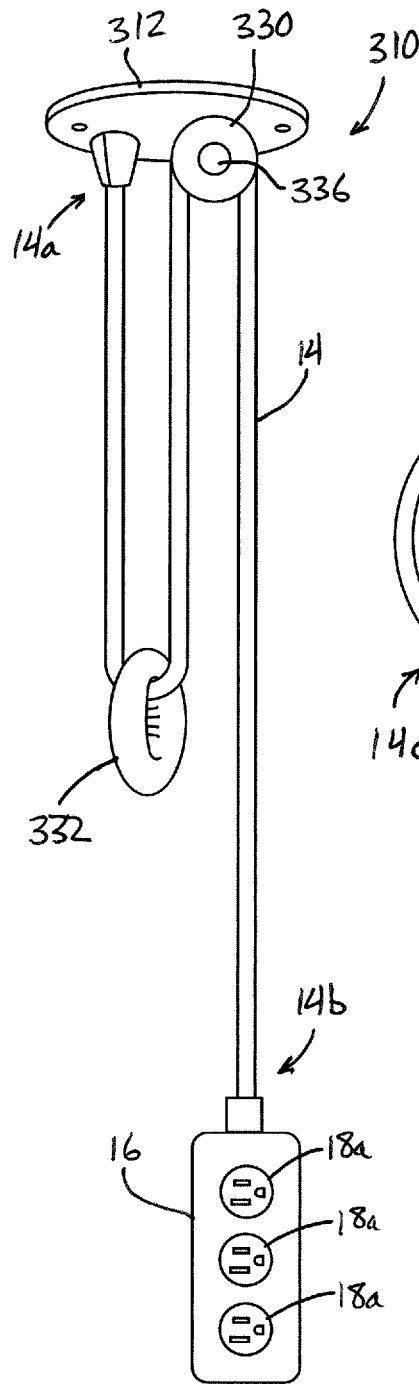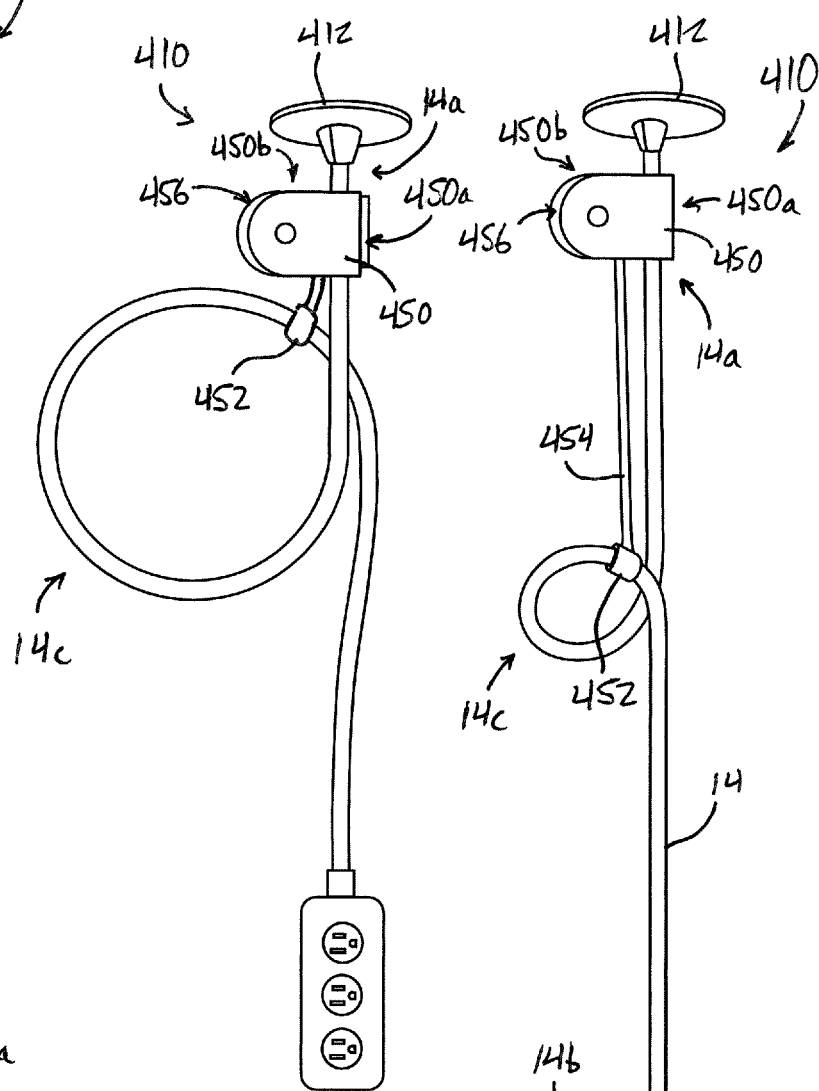
FIG. 4
FIG. 5A
FIG. 5B

OVERHEAD ELECTRICAL INFEED

CROSS REFERENCE TO RELATED APPLICATIONS

The present application is a continuation-in-part of U.S. patent application Ser. No. 16/253,001, filed Jan. 21, 2019, which claims the filing benefits of U.S. provisional applications, Ser. No. 62/619,233, filed Jan. 19, 2018 and Ser. No. 62/683,615, filed Jun. 11, 2018; the present application also claims the filing benefits of U.S. provisional application, Ser. No. 62/794,524, filed Jan. 18, 2019, which are all hereby incorporated herein by reference in their entireties.

FIELD OF THE INVENTION

The present invention relates to electrical outlets and wiring for work areas, living spaces, and the like.

BACKGROUND OF THE INVENTION

Electrical infeeds are used to provide users with convenient access to electrical power, and typically include at least one electrical socket or connector that is compatible with electrical or electronic devices that are commonly used in a work area, living space, or the like.

SUMMARY OF THE INVENTION

The present invention provides an overhead electrical infeed system for providing height-adjustable electrical or electronic data outlets to users in a work area, living space, or the like. The system includes an overhead mount, an electrical cord coupled to the overhead mount surface, and an electrical outlet assembly coupled to a distal end portion of the cord having a proximal end portion mounted to the overhead mount surface and a distal end portion spaced from the proximal end portion. At least a portion of the weight of the electrical outlet assembly is supported by the electrical cord. A retractor is positioned along the electrical cord and is operable to raise the electrical outlet assembly or to retain the electrical outlet assembly at a selected height or elevation. An electrical outlet at the outlet assembly is electrically energized by the electrical cord and is mounted to the electrical outlet assembly, to provide users with access to electrical or data signals.

In one form of the present invention, an overhead electrical infeed system includes an overhead mount, an electrical cord, an electrical outlet assembly, and a retractor. The overhead mount includes a cord securement portion and a cord movement portion. The electrical cord includes a proximal end portion, a free distal end portion, and an intermediate portion. The cord's proximal end portion is fixedly mounted to the cord securement portion of the overhead mount, the cord's free distal end portion is spaced from the proximal end portion, and the intermediate portion is disposed between the proximal end portion and the free distal end portion. The intermediate portion includes a first region that moves along or over the cord movement portion of the overhead mount, and a second region that is between the first region and the proximal end portion and supports the retractor. The electrical outlet assembly is coupled to and suspended from the free distal end portion of the electrical cord. The retractor includes a cord-engaging member that is movably disposed along the second region of the intermediate portion of the electrical cord. The retractor is configured to counterbalance the electrical outlet assembly by maintaining the electrical outlet assembly at a selected elevation below the overhead mount, or by raising the electrical outlet assembly relative to the overhead mount.

In another form of the present invention, an overhead electrical infeed system includes electrical cord, an electrical outlet assembly, and a slidable mount. The electrical cord has a proximal end portion configured to be fixedly mounted to an overhead mount, a free distal end portion spaced from the proximal end portion, and an intermediate portion between the cord's proximal end portion and the free distal end portion. The electrical outlet assembly is coupled to the free distal end portion of the electrical cord, the slidable mount is movably disposed along the electrical cord, and the electrical outlet assembly is releasably securable to the slidable mount. The slidable mount is frictionally engaged with an outer surface of the electrical cord and is configured to support the electrical outlet assembly along the intermediate portion of the electrical cord.

In yet another form of the present invention, an overhead electrical infeed system includes a horizontal retractor track, a retractor pulley, a fixed pulley, and an electrical cord. The horizontal retractor track is mountable in an elevated location, and has a proximal end portion and a distal end portion opposite the proximal end portion. The retractor pulley is movably disposed along the retractor track, and the fixed pulley is spaced from the distal end portion of the retractor track. The electrical cord includes a proximal end portion for fixed mounting at the elevated location proximate the retractor track, a free distal end portion spaced from the proximal end portion; and an intermediate portion disposed between the proximal end portion and the free distal end portion. The cord's intermediate portion includes a first region that is reeved around the retractor pulley, and a second region that is reeved around the fixed pulley. The electrical outlet assembly is coupled to and suspended from the free distal end portion of the electrical cord, below the fixed pulley. The retractor pulley is biased toward the proximal end portion of the retractor track in order to maintain the electrical outlet assembly at a selected elevation below the fixed pulley, or to raise the electrical outlet assembly relative to the fixed pulley.

Therefore, the overhead electrical infeed system includes an outlet assembly or other portion (such as the retractor) that can be easily grasped by a user and manually raised or lowered to thereby change the elevation of the electrical outlet(s) to a convenient location for the user. The weight of the outlet assembly and outlet(s) are generally counterbalanced by the retractor, while friction elements may be disposed along the cord (such as friction bearings for pulleys) to help maintain a desired elevation for the outlet assembly.

These and other objects, advantages, purposes and features of the present invention will become apparent upon review of the following specification in conjunction with the drawings.

BRIEF DESCRIPTION OF THE DRAWINGS

FIG. 4 is a front perspective view of another overhead electrical infeed device in accordance with the present invention;

FIG. 5A is a front perspective view of another overhead electrical infeed device in accordance with the present invention, shown in a retracted position;

FIG. 5B is another front perspective view the overhead electrical infeed device of FIG. 5A, shown in an extended position;

DESCRIPTION OF THE PREFERRED EMBODIMENTS

Figures 1, 2, 3:
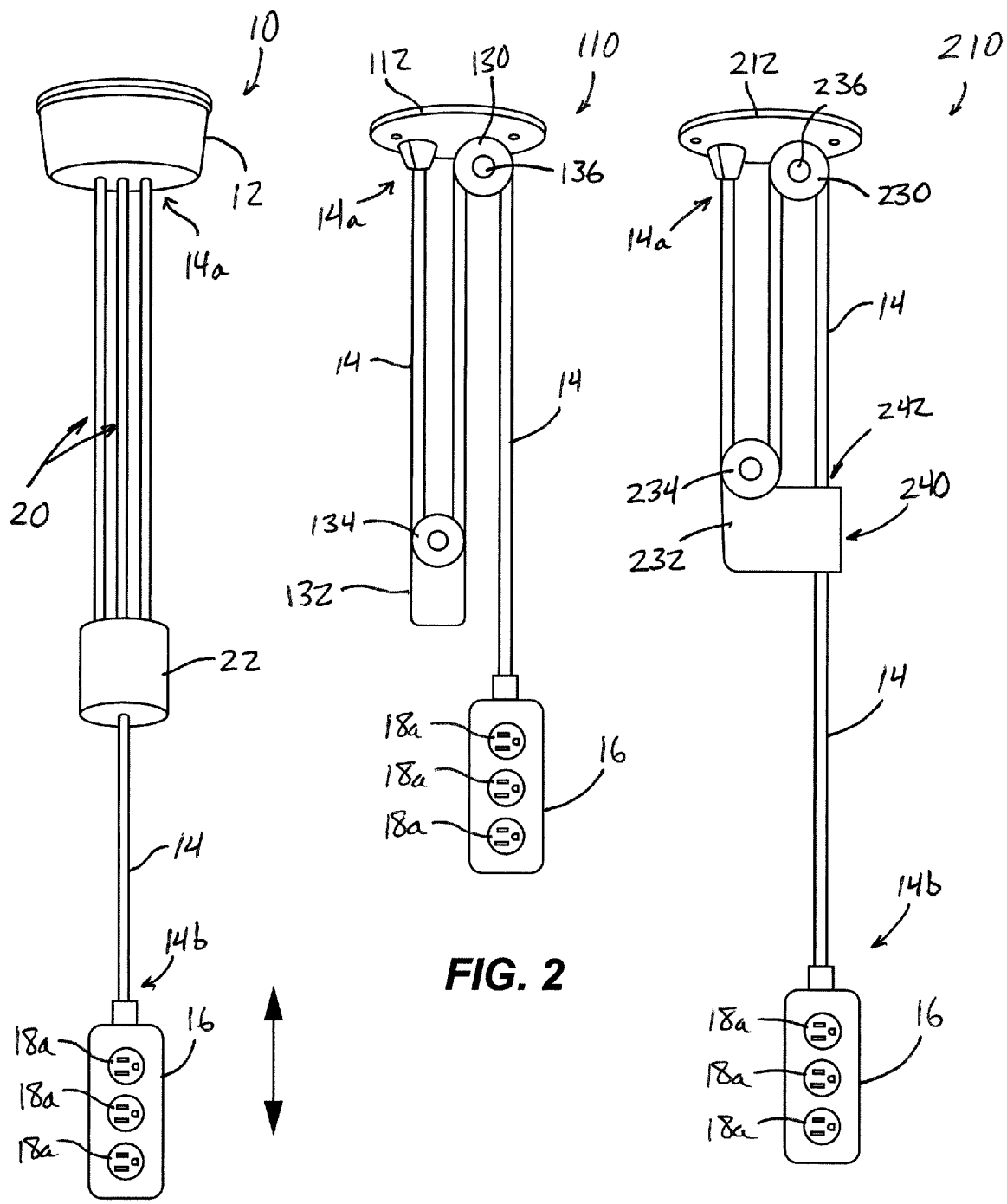
FIG. 1 is a front perspective view of an overhead electrical infeed device in accordance with the present invention.
FIG. 2 is a front perspective view of another overhead electrical infeed device in accordance with the present invention.
FIG. 3 is a front perspective view of another overhead electrical infeed device in accordance with the present invention.

Referring now to the drawings and the illustrative embodiments depicted therein, various overhead electrical infeed systems and related products are disclosed. In each of the overhead electrical infeed systems, an electrical power outlet assembly is vertically extendable and retractable relative to an upper mounting location (such as a ceiling surface) for an electrical cord associated with the outlet assembly. The electrical outlet assemblies may support one or more high voltage AC power outlets such as 110V or 220V AC outlets, and/or may support one or more low voltage DC power outlets such as 5V to 18V DC outlets (e.g., USB-style outlets). Where only high voltage AC power is supplied to a given electrical outlet assembly, the high voltage AC power may be routed directly to any high voltage AC power outlets, and through a DC power converter contained within housing 16 to supply the lower voltage DC power to any DC power outlets. Although primarily described as an electrical power system, it will be appreciated that the principles of the present invention are equally applicable to electronic data systems having electronic signal receptacles and the like, and that the invention is not intended to be limited to systems for electrically powering other devices.

With reference to FIG. 1, an overhead electrical infeed system 10 includes an overhead mount plate 12, an electrical cord or cable 14 for carrying electrical power and/or electronic data signals has a proximal end portion 14a fixed to mount plate 12 and a distal end portion 14b where an electrical power outlet assembly 16 is attached, with an intermediate cord portion 14c disposed therebetween. In each of the embodiments described herein, an electrical power outlet assembly 16 is vertically extendable and retractable relative to the corresponding mount plate, which may be attached to a ceiling surface, an overhead girder, or substantially any other overhead or elevated structure. The electrical outlet assemblies 16 may support one or more high voltage AC power outlets 18a, such as 110V or 220V AC outlets, and/or may support one or more low voltage DC power outlets 18b, such as 5V to 18V DC outlets (e.g., USB-style outlets). Where only high voltage AC power is supplied to a given electrical outlet assembly 16, the high voltage AC power may be routed directly to any high voltage AC power outlets 18a, and through a DC power converter contained within housing 16 to supply the lower voltage DC power to any DC power outlets 18b. Although primarily described as an electrical power system, it will be appreciated that the principles of the present invention are equally applicable to electronic data systems having electronic signal receptacles and the like, and that the invention is not intended to be limited to systems for electrically powering other devices.

In the embodiment of FIG. 1, a pair of support cables 20 extend down from overhead mount plate 12, which is in the form of a generally cylindrical housing, to a retractor assembly 22. Power cord 14 may be wound onto a self-retracting spool contained in retractor assembly 22, so that a lower portion of cord 14 (including distal end portion 14b) is extendable and retractable relative to retractor assembly 22. In an alternative arrangement, retractor assembly 22 may house a simple pulley system in which support cables 20 are wound or routed in such a manner as to cause retractor assembly 22 to rise and fall relative to overhead mount plate 12, with electrical outlet assembly 16 and distal end portion 14b of the power cord rising and falling with retractor assembly 22. A clock spring, electric winder, or similar mechanism may be used to provide lifting force for raising electrical outlet assembly 16, and optionally for also raising retractor assembly 22.

Referring now to FIG. 2, another overhead electrical infeed system 110 includes an overhead mount plate 112 having proximal end portion 14a of power cord 14 fixed thereto, and with a pulley 130 also attached to overhead mount plate 112, spaced laterally from the cord proximal end portion 14a. A counterweight 132 is positioned along a section of power cord 14 between proximal end portion 14a and pulley 140, and has its own pulley 134 to facilitate rolling along power cord 14 as electrical outlet assembly 16 is manually raised and lowered by a user. The weight of counterweight 132 is sufficient to balance the weight of electrical outlet assembly 16 and electrical power outlets 18a, 18b, so that electrical outlet assembly 16 will remain vertically fixed when not being manually moved. It will be appreciated that pulley 130 may be fitted with a frictional bearing 136 to resist rotation of its pulley wheel. This friction compensates for the changing amount of power cord 14 (and its weight) between electrical outlet assembly 16 and pulley 130, so that as electrical outlet assembly 16 is lowered and released, the added weight of cord 14 between housing 16 and pulley 130 will not cause the housing 16 to continue to drop. Thus, it will be appreciated that pulley 130 and counterweight 132 cooperate to act as a retractor for power cord 14 as electrical outlet assembly 16 is manually raised by a user.

Optionally, a variation on the overhead electrical infeed system 110 is another overhead electrical infeed system 210 (FIG. 3) in which a counterweight 232 with its own counterweight pulley 234 has a laterally-extending counterweight housing portion 240 with a vertically-aligned guide channel or bore 242 through which passes a portion of power cord 14 located between electrical outlet assembly 16 and a pulley 230 that is fixedly mounted to an overhead mount plate 212. Guide channel 242 permits power cord 14 to slide freely through counterweight housing portion 240 as electrical outlet assembly 16 is raised and lowered, and serves to prevent entanglement or rubbing of respective cord portions, and to prevent entanglement or rubbing of cord portions with counterweight 232, as the outlet assembly 16 is moved laterally and/or raised and lowered. Optionally, a clamping device (such as a lever-actuated or button-actuated clamping device) may be incorporated into counterweight housing portion 240 and operable to selectively impinge on power cord 14 inside of guide channel 242, to allow a user to selectively secure the vertical position of electrical outlet assembly 16 until choosing to release the clamping device. Suitable clamping devices may include, for example, a cam-lever, a spring-biased peg or other extendable member, a V-shaped impinging element, or the like. In other respects overhead electrical infeed system 210 may be substantially similar or identical to system 110, described above, with like numerals used to designate components of system 210 that correspond to like components of system 110 with the addition of 100.

Figure 3A:
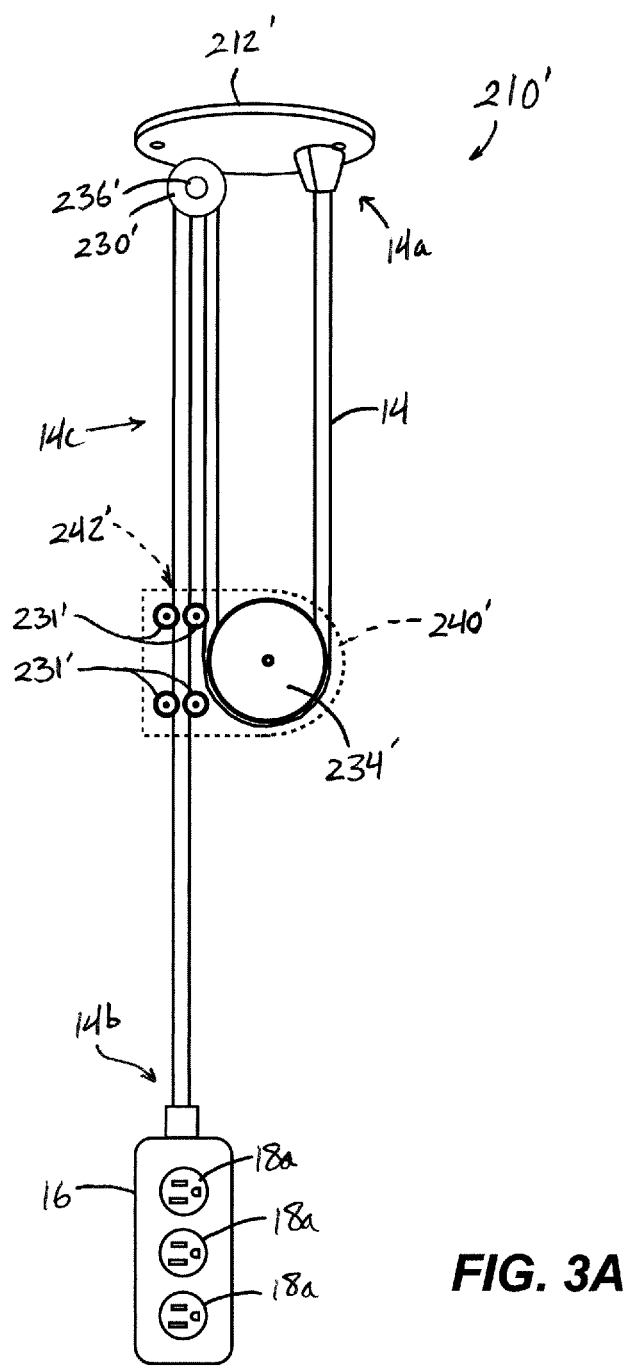
FIG. 3A is a front perspective view of another overhead electrical infeed device that is similar to the overhead electrical infeed device of FIG. 3.

Another overhead electrical infeed system 210' (FIG. 3A) provides a similar configuration as the infeed system 210. Infeed system 210' includes an overhead pulley 230' with bearing 236' mounted to an overhead mount plate 212, and a counterweight 232' that may be weighted portions of a counterweight housing portion 240'. A counterweight pulley 234' is rotatably supported in housing portion 240 and has an intermediate cord portion 14c routed underneath, up to overhead pulley 230', and back down through a vertically-aligned guide channel 242' in the counterweight housing portion 240'. A plurality of counterweight pulleys 231' are rotatably supported in the guide channel 242' and are laterally spaced from the counterweight pulley 234' to maintain a substantially fixed lateral spacing between the regions of intermediate cord portion 14c that are passing through the counterweight housing portion 240'.

In a still further embodiment that is similar to overhead electrical infeed system 110, another electrical infeed system 310 is fitted with a generally ring-shaped or annular counterweight 332 (FIG. 4) that simply slides along a section of power cord 14 located between the power cord's proximal end portion 14a and a pulley 330 that is mounted to an overhead mount plate 312. Ring-shaped counterweight 332 may have polished radially-inwardly facing surfaces to limit or prevent abrading power cord 14. Ring-shaped counterweight 332 may be lower in cost to produce as compared to counterweights 132, 232, and may also be considered more aesthetically pleasing due to its simple shape and lack of a pulley or extraneous parts. In other respects overhead electrical infeed system 210 may be substantially similar or identical to system 110, described above, with like numerals used to designate components of system 310 that correspond to like components of system 110 with the addition of 200.

Figure 9:
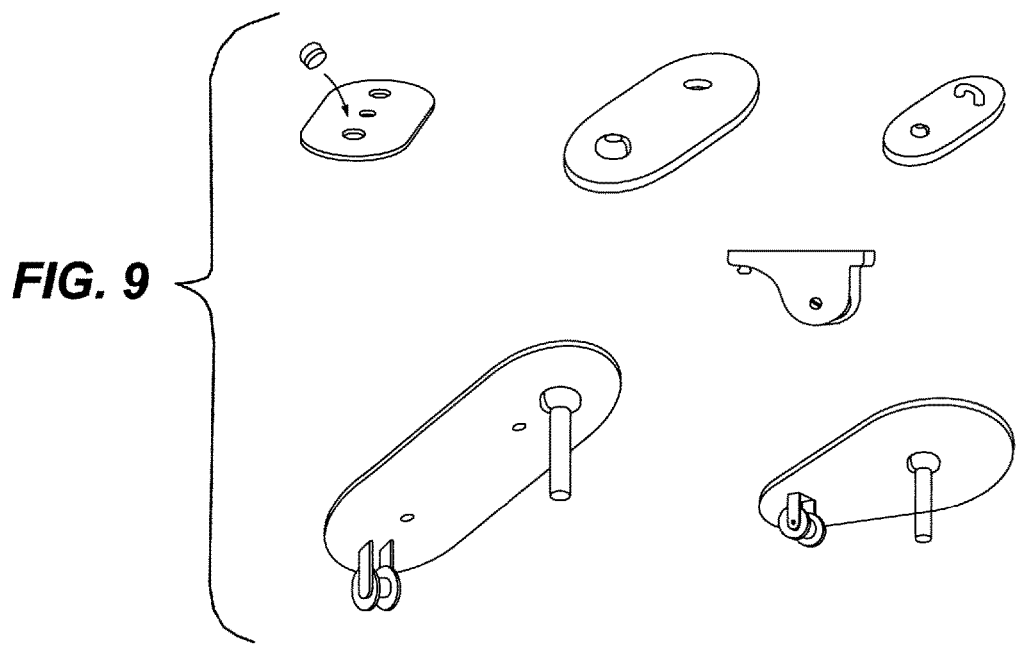
FIG. 9 is a series of perspective views of a plurality of mounting plates and pulleys compatible for use with a subset of the overhead electrical infeed devices.
Figure 10:
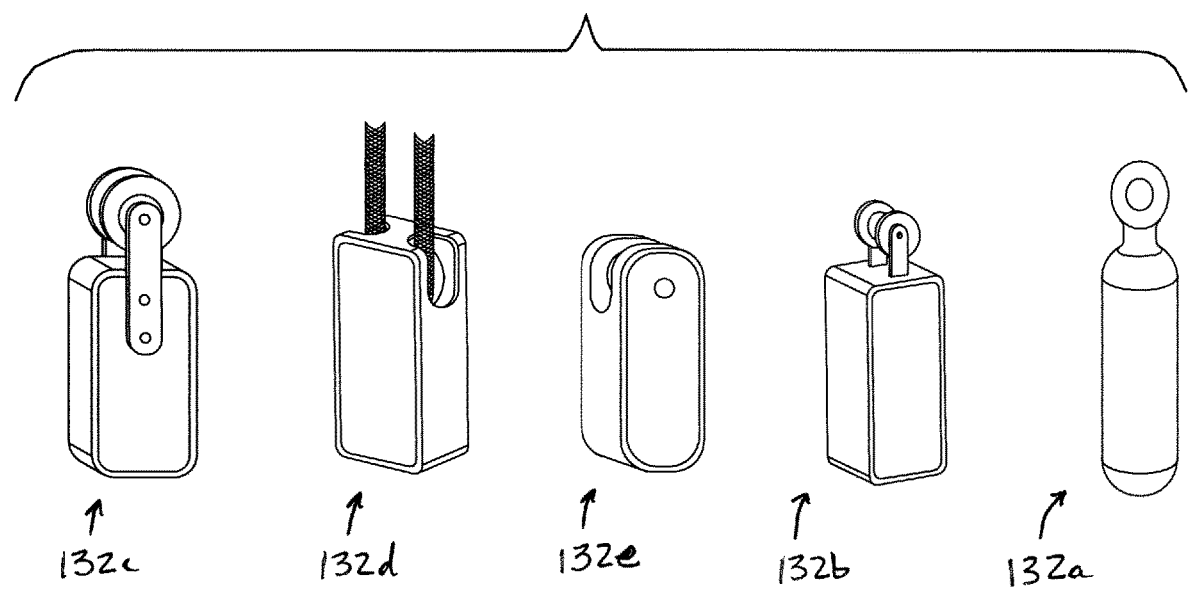
FIG. 10 is a series of perspective views of a plurality of different weights compatible for use with a subset of the overhead electrical infeed devices.
Figure 11:
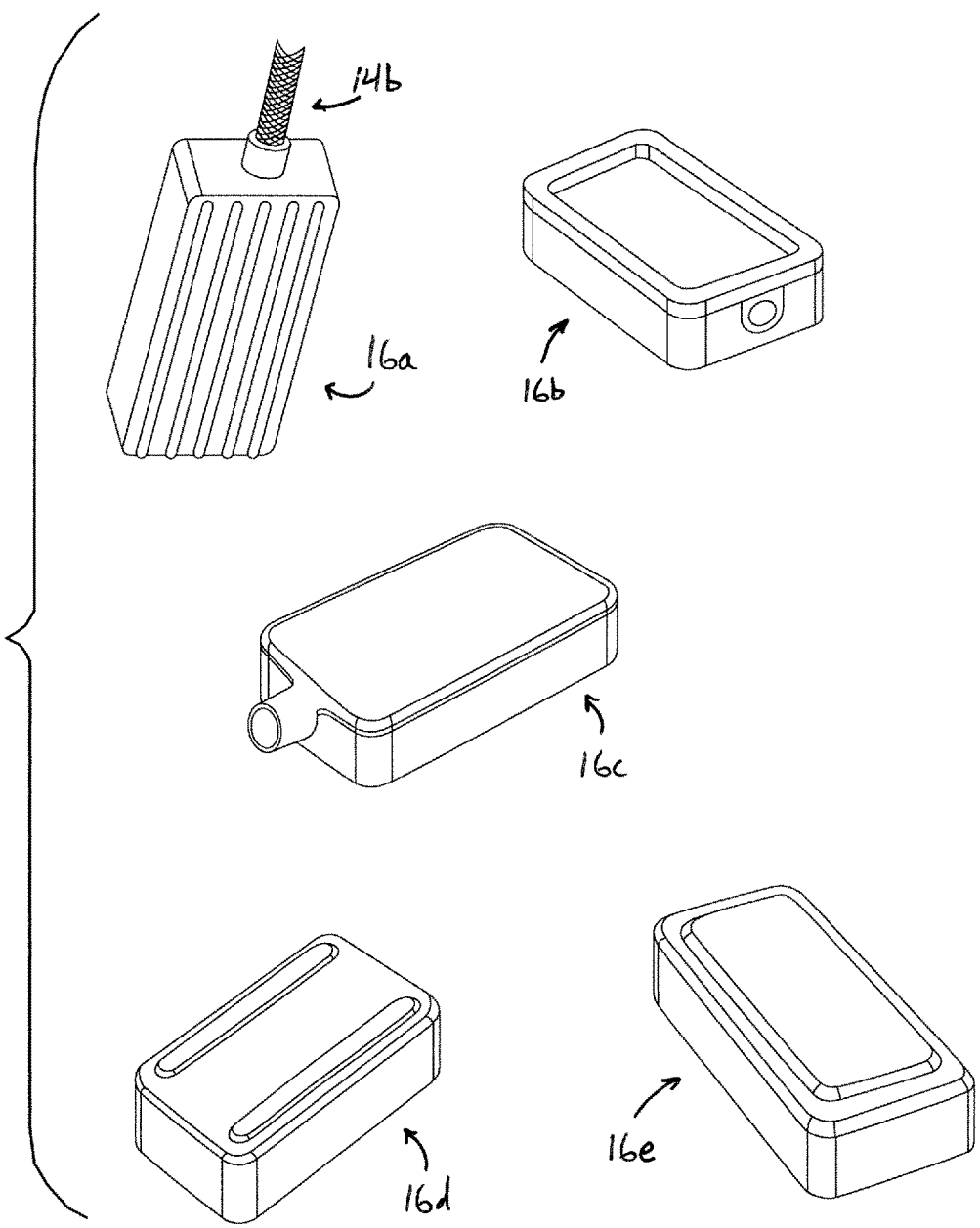
FIG. 11 is a series of perspective views of a plurality of electrical outlet assemblies compatible for use with the overhead electrical infeed devices.

Various other types of counterweights are envisioned, such as shown in FIG. 10. For example, there are shown a first alternative counterweight 132a having an upper ring with polished inner surfaces and a lower weighted portion, a second alternative counterweight 132b having an upper pulley mounted to a lower weighted portion via a pair of brackets, a third alternative counterweight 132c having an upper pulley mounted to a lower weighted portion via a pair of integral brackets extending upwardly from an upper surface of the lower weighted portion, a fourth alternative counterweight 132d having an integral pulley contained in an upper end portion of a weight, and a fifth alternative counterweight 132e that is substantially identical to the fourth alternative counterweight 132d except for fifth alternative counterweight 132e having a rounded bottom end. Moreover, various other shapes and configurations of overhead mount plates and ceiling-mounted or plate-mounted pulleys are envisioned, such as shown in FIG. 9. In addition, various shapes and configurations of power outlet assemblies 16a-e are envisioned, such as shown in FIG. 11.

It is further envisioned that spring-loaded pulleys may be used to provide vertical adjustment for an overhead-mounted electrical outlet assembly. For example, in FIGS. 5A-6B there are shown two implementations of spring-loaded pulleys. FIGS. 5A and 5B depict an electrical infeed system 410 in which power cord 14 is supported by an overhead mount plate 412 and has a retractor 450 having a clamping side 450a secured to proximal end portion 14a of power cord 14 just below mount plate 412. A power cord loop 14c is formed in a central region of power cord 14, between proximal end portion 14a and distal end portion 14b. A cord clamp or gripper 452 is secured to power cord 14 near an end of power cord loop 14c that is closer to distal end portion 14b. A retractor cord 454 is wound around a pulley or winding spool 456 that is disposed in a retractor side 450b of the retractor 450, and has a distal end 454b attached to the cord clamp or gripper 452. Retractor 450 contains a clock spring or other biasing member that winds retractor cord 454 onto the winding spool 456, thus drawing electrical outlet assembly 16 upwardly to a raised or retracted position such as shown in FIG. 5A. A ratcheting device, centrifugal clutch, or similar mechanism may be incorporated into retractor 450 to selectively limit or cancel the upward biasing force when electrical outlet assembly 16 is at a lowered position (FIG. 5B), so that electrical outlet assembly 16 will remain at that lowered position until a user manually raises the outlet assembly 16 or gives an initial downward pull on the outlet assembly to release the mechanism and permit retractor cord 454 to be wound onto the winding spool 456 as the outlet assembly and distal end portion 14b of the power cord are raised. In other respects, overhead electrical infeed system 410 may be substantially similar or identical to system 110, described above, with like numerals used to designate components of system 410 that correspond to like components of system 110 with the addition of 300.

Another electrical infeed system 510 (FIGS. 6A and 6B) is similar in some respects to electrical infeed system 410 of FIGS. 5A and 5B, including a retractor 550 with a retractor cord 554 wound around a pulley or winding spool 556 that is disposed in a retractor or spool side 550b. However, the retractor 550 of electrical infeed system 510 has a securing side 550a that is configured to mount to a surface such as a ceiling surface or other overhead support, which may be the same surface to which an overhead mount plate 512 is attached. A distal end portion 554b of retractor cord 554 is attached directly to electrical power outlet assembly 16, and rather than forming a loop in the power cord as in the system 410 of FIGS. 5A and 5B), system 510 includes a power cord 514 having a spring-like resilient middle cord section 514c disposed between a proximal end portion 514a attached to overhead mount plate 512 and a distal end portion 514b attached to electrical power outlet assembly 16.

Figures 6A, 6B:
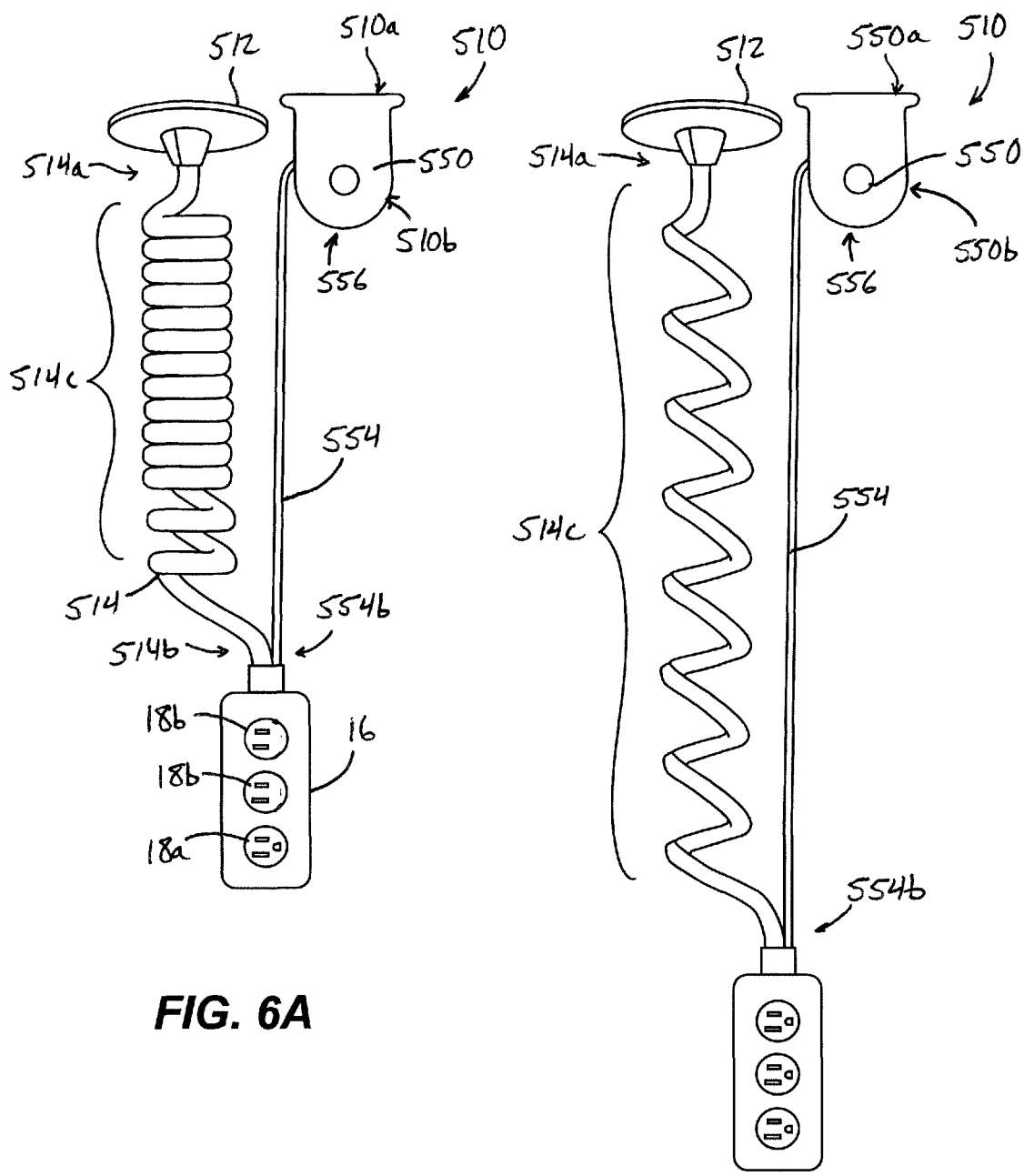
FIG. 6A is a front perspective view of another overhead electrical infeed device in accordance with the present invention, shown in a retracted position.
FIG. 6B is another front perspective view the overhead electrical infeed device of FIG. 6A, shown in an extended position.

As outlet assembly 16 is manually grasped and lowered by a user, retractor cord 554 is payed out from retractor 550 as it unwinds from winding spool 556, against the biasing force applied to the spool by a biasing mechanism in retractor 550. The resilient middle cord section 514c expands like a coil spring as outlet assembly 16 is lowered, such as shown in FIG. 6B. When outlet assembly 16 is raised, the resilience of middle cord section 514c causes it to retract again toward the more compact configuration of FIG. 5A, as retractor cord 554 is wound back onto winding spool 556. It will be appreciated that resilient middle cord section 514c does not have enough resilient biasing force to raise outlet assembly 16 from the lowered position of FIG. 5B, such that retractor cord 554 remains in tension and supports a portion of the weight of the outlet assembly 16 when the outlet assembly is in its lowered position. The additional biasing force provided by retractor 550 is needed to lift outlet assembly 16 from its lowered position.

Figures 7A, 7B:
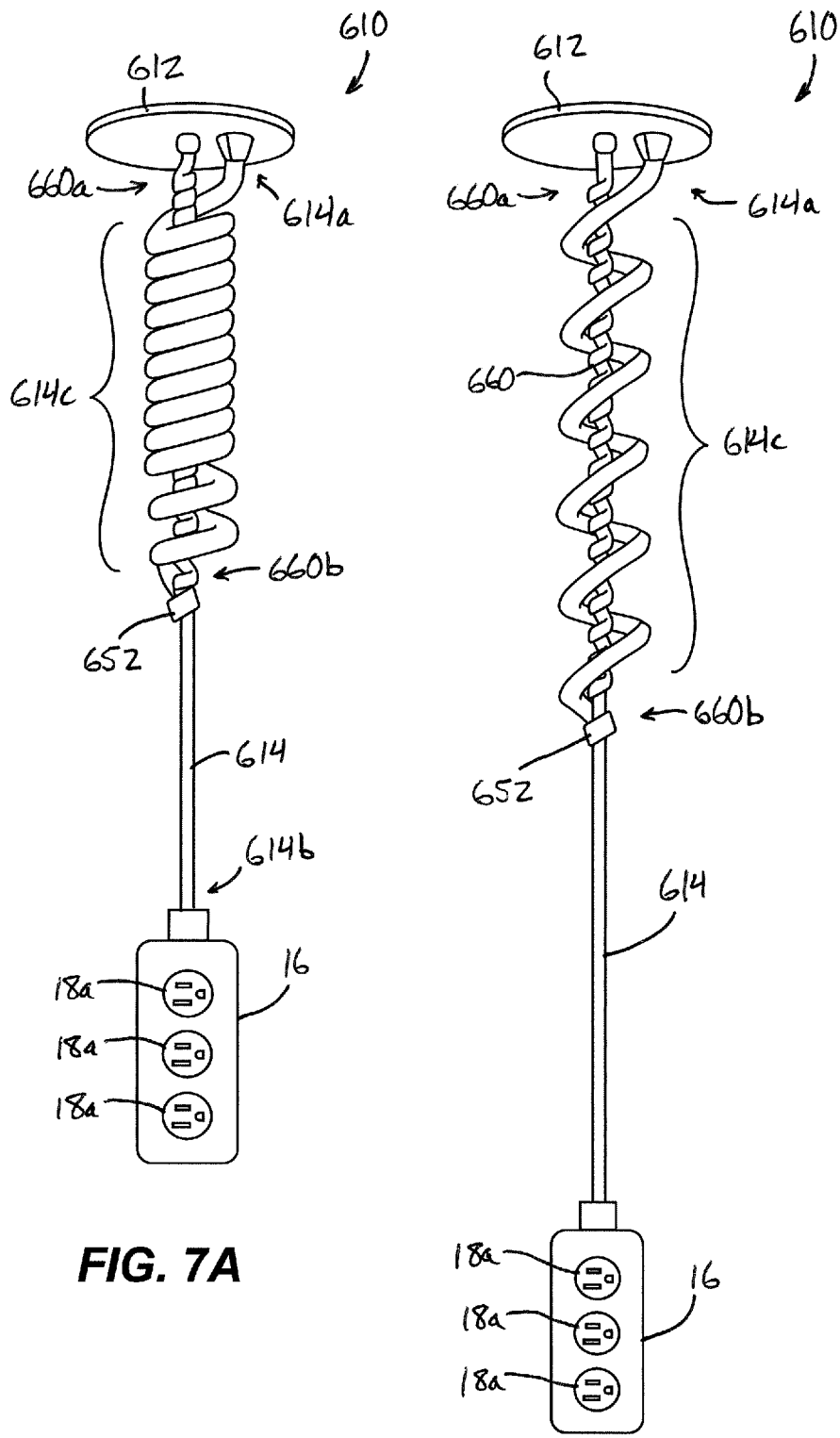
FIG. 7A is a front perspective view of another overhead electrical infeed device in accordance with the present invention, shown in a retracted position.
FIG. 7B is another front perspective view the overhead electrical infeed device of FIG. 7A, shown in an extended position.

In another arrangement an electrical infeed system 610 (FIGS. 7A and 7B) is similar in some respects to both the electrical infeed system 410 of FIGS. 5A and 5B, and the electrical infeed system 510 of FIGS. 6A and 6B. In the case of electrical infeed system 610, however, there is no winding retractor or pulley, and instead a coil "helper spring" or resilient cord 660 is provided to facilitate raising power outlet assembly 16, and there is no mechanism provided to retain power outlet assembly 16 in the lowered position of FIG. 7B. An electrical power cord 614 includes a resilient middle cord section 614c disposed between an upper or proximal end portion 614a and a lower or distal end portion 614b. The coil helper spring or resilient cord 660 has a proximal end portion 660a attached to an overhead mount plate 612 and a distal end portion 660b attached to power cord 614 at a lower end of the resilient cord section 614c via a cord clamp or gripper 652. Electrical power cord 614 has its proximal end portion 614a attached to overhead mount plate 612, and its distal end portion 614b coupled directly to power outlet assembly 16. Coil helper spring or resilient cord 660 extends centrally through the coiled resilient cord section 614, as best shown in FIG. 7B, and may be substantially obscured from view by the coiled resilient cord section 614 when power outlet assembly 16 is raised (FIG. 7A). Because no mechanism is provided to retain power outlet assembly 16 in the lowered position of FIG. 7B, power outlet assembly 16 may be free to raise and lower during use, according to the amount of downward force applied to electrical cords and devices plugged into its one or more electrical outlets 18a, 18b.

Figure 8:
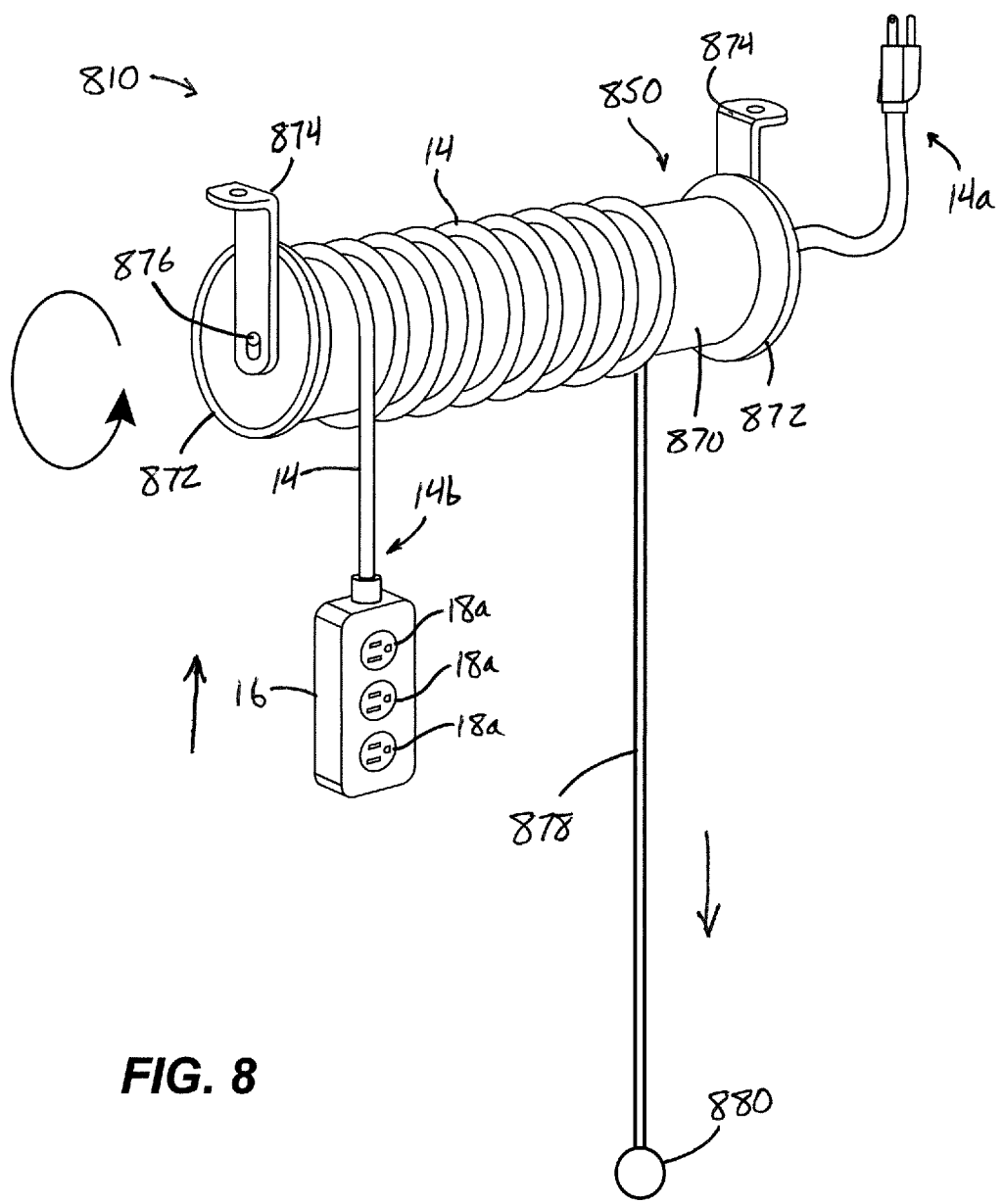
FIG. 8 is a series of front perspective views of four spool-type electrical infeed devices in accordance with the present invention.

Referring now to FIG. 8, a spool-type overhead electrical infeed system 810 includes an exposed manually-wound retractor assembly 850 includes a spool 870 with enlarged-diameter end flanges 872, and L-brackets 874 mounted at the opposite ends of a spindle or axle 876 that extends through a central axis of spool 870. Proximal end portion 14a of power cord 14 is fitted with a conventional 110V AC plug for engaging an electrical power source, such as a conventional ceiling-mounted power outlet. A biasing winding force may be selectively applied to spool 870, in the direction of a curved arrow in FIG. 8, by a user pulling downwardly on a winding cord 878 that is drawn off of spool 870 on an opposite side from where the electrical outlet assembly 16 and outlets 18a are suspended by the distal end portion 14b of the cord 14. A knob 880 or other grasping feature may be provided to facilitate gripping by a user for raising or lowering the winding cord 878. Optionally, spool 870 incorporates a friction feature, ratcheting feature, spring-biasing element, or the like, which allows the spool 870 to be stopped at different elevations of the outlet assembly 16. Optionally, winding cord 878 and/or knob 880 may be weighted to counterbalance the outlet assembly 16 and portion of the cord 14 that extends between the outlet assembly 16 and the spool 870.

Figure 12:
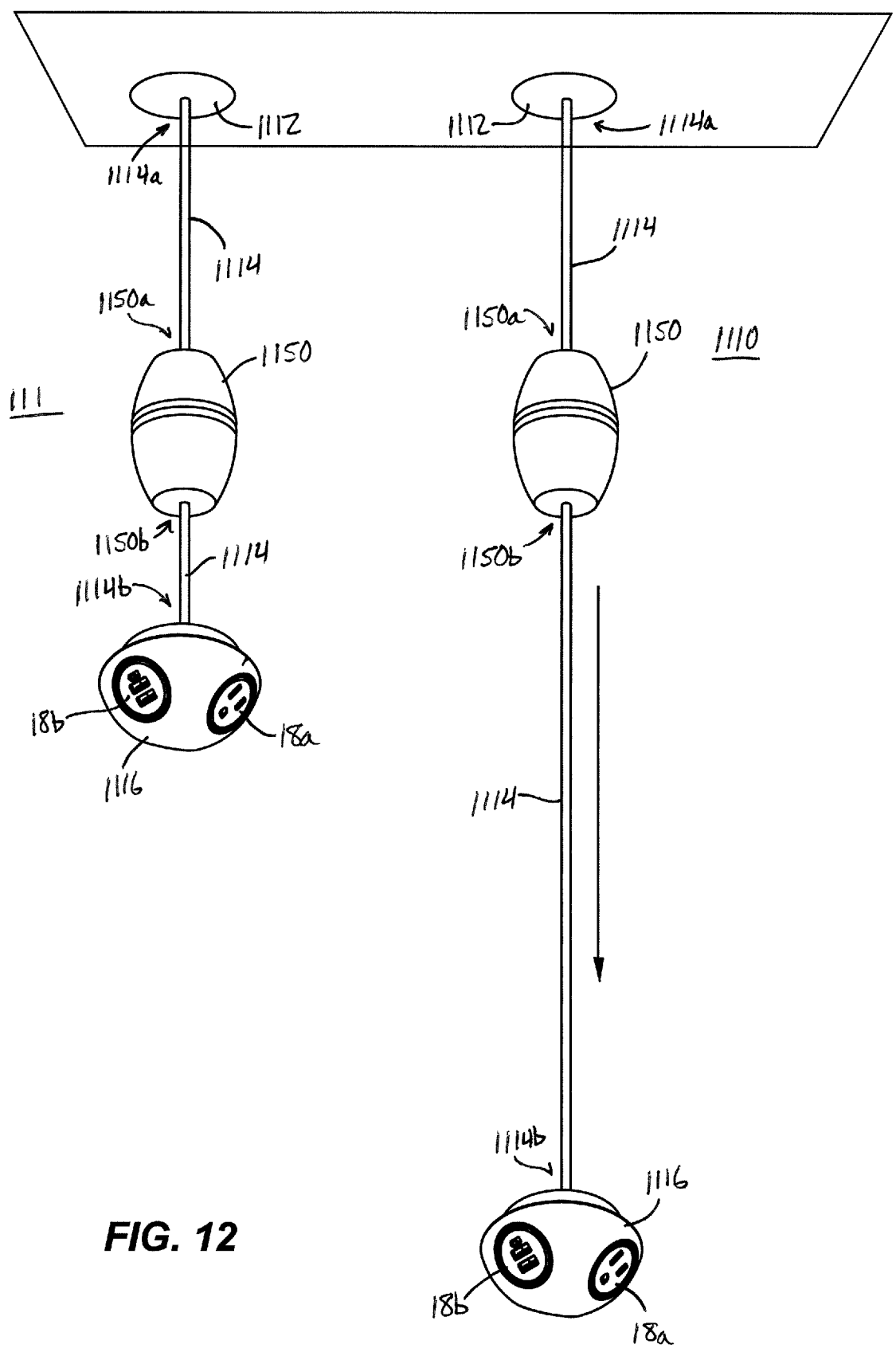
FIG. 12 is a perspective view of a pair of enclosed coil-type electrical infeed devices in accordance with the present invention, shown in retracted and extended configurations.
Figure 12A:
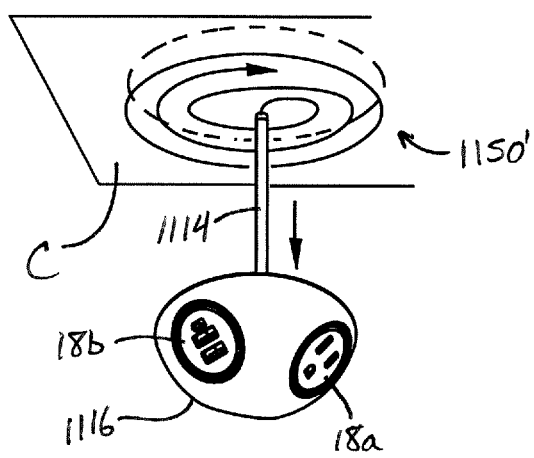
FIG. 12A is a perspective view of a recessed above-the-ceiling coil-type electrical infeed device.
Figure 12B:
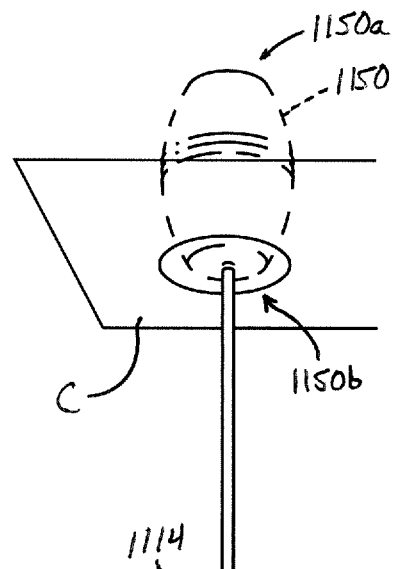
FIG. 12B is a perspective view of another enclosed coil-type electrical infeed device, shown in a recessed above-the-ceiling arrangement.
Figure 12B:
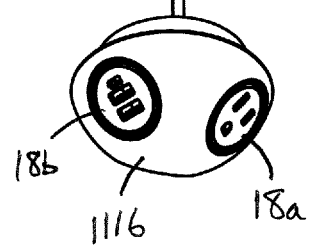

In another arrangement an electrical infeed system 1110, two of which are depicted in FIG. 12 at raised (left) and lowered (right) positions, an electrical cord or cable 1114 for carrying electrical power and/or electronic data signals has a proximal end portion 1114*a* fixed to mount plate 1112 and a distal end portion 14*b* where an electrical power outlet assembly 1116 is attached. In the embodiment of FIG. 12, a retractor assembly 1150 contains a coiled or spooled section of cable 1114, which permits a user to pull down on the outlet assembly 1116 and extend (or release to shorten) the distance between the power outlet assembly 1116 and the mount plate 1112 or associated ceiling surface. Optionally, and as shown in FIG. 12B, the retractor assembly 1150 may be recessed above a ceiling surface C, in which case the retractor assembly 1150 may be retained in a fixed position above the ceiling surface C. However, it is further envisioned that the retractor assembly 1150 can be configured so that the electrical cord or cable 1114 may be payed out and retracted into both the top end 1150*a* and bottom end 1150*b* of the retractor assembly 1150. Referring to FIG. 12A, a ceiling-concealed retractor 1150' is shown to be recessed and hidden above the ceiling surface C, so that only a portion of electrical cord or cable 1114 is visible entering the ceiling surface C from below, and retraction and extension of cable 1114 above ceiling surface C.

Figure 13:
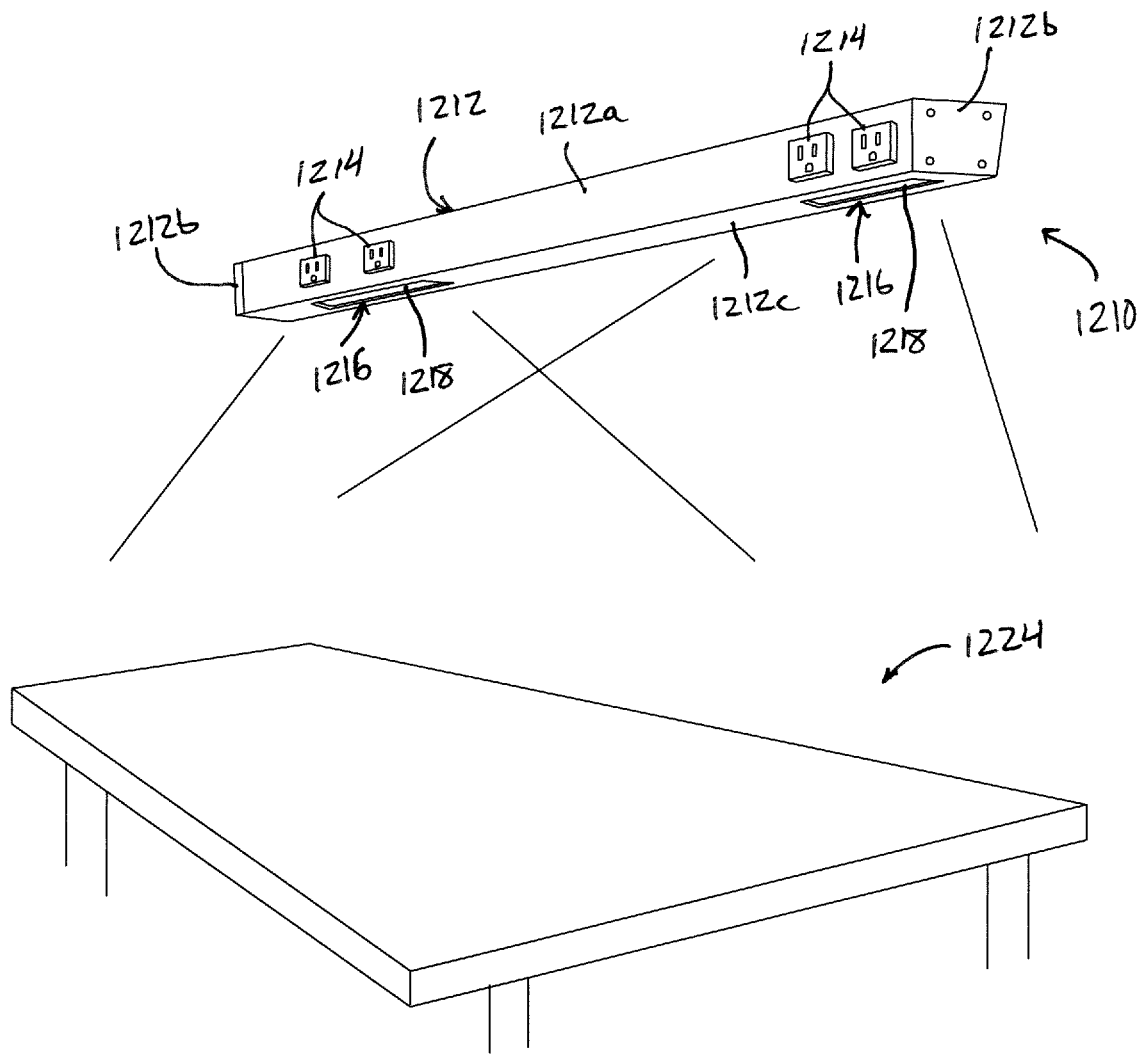
FIG. 13 is a perspective view of a ceiling-suspended electrical infeed device with downwardly-directed lighting positioned over a work surface.

Optionally, lighting capability may be provided in an electrical infeed system 1210, such as shown in FIG. 13. Electrical infeed system includes an elongated housing 1212 supporting a plurality of electrical outlets 1214 along one or more sides 1212*a* of the housing 1212. A pair of removable end caps 1212*b* provide access to an interior of the housing 1212, where wiring, electrical lighting 1216, and portions of the outlets 1214 are located. Lighting 1216 shines downwardly through a slot or opening 1218 in a lower panel 1212*c* of the housing 1212, which slot or opening 1218 may optionally be fitted with a lens. An electrical power cord 1220 extends downwardly and enters housing 1212 to supply electrical energy to the outlets 1214 and the lighting 1216. A set of suspension cords extend downwardly from the ceiling and attach to the housing 1212 to support the infeed system 1210 over a work surface 1224. Optionally, pulleys are provided for mounting the cords to the ceiling, to provide height-adjustability for the electrical infeed system 1210.

Figure 14:
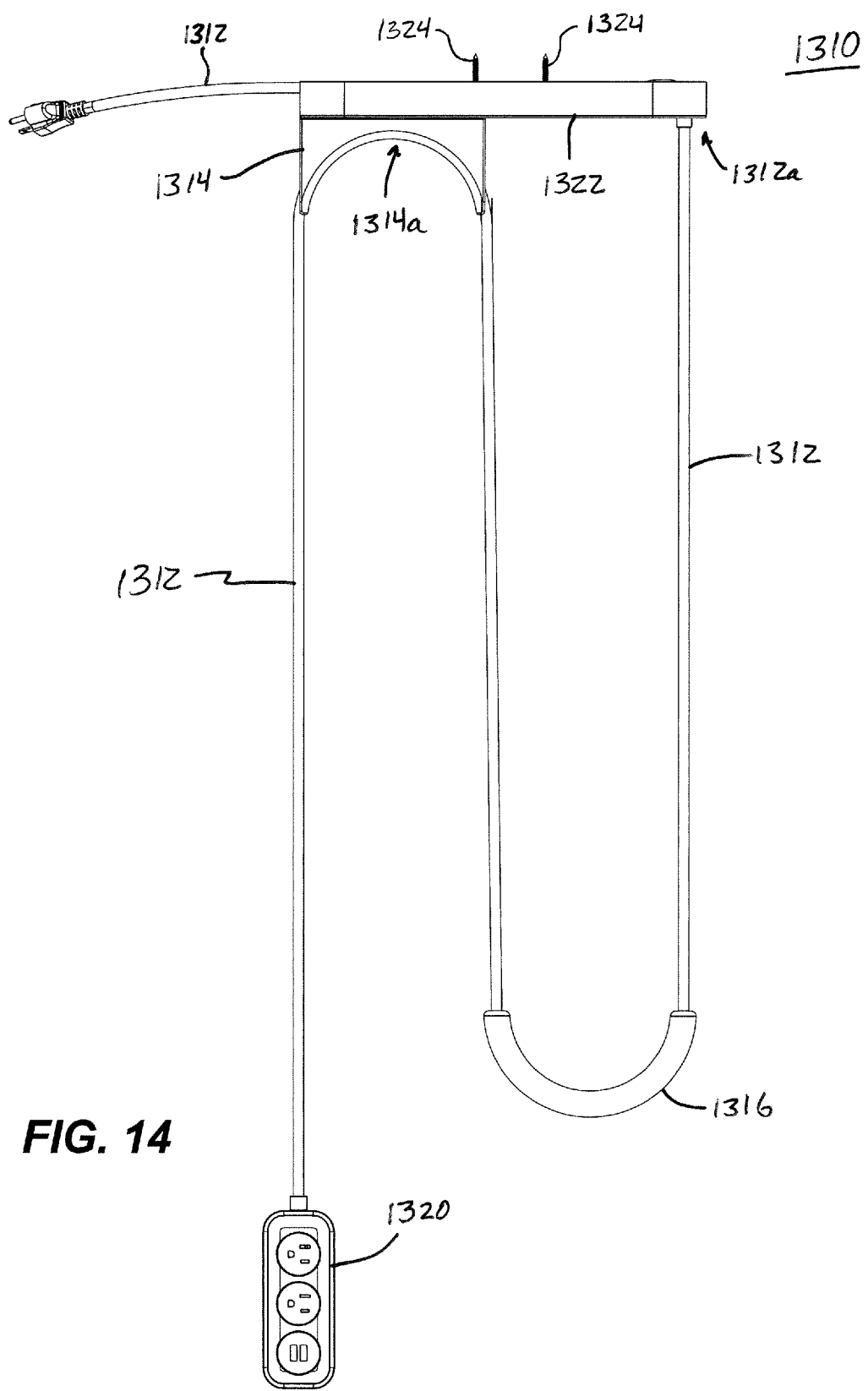
FIG. 14 is a side elevation of another overhead electrical infeed device in accordance with the present invention.

Referring now to FIG. 14, there is shown an overhead electrical infeed device 1310 with an electrical cord 1312 routed around a fixed radiused bearing component 1314 and a movable weighted radiused bearing component 1316. Fixed bearing component 1314 is coupled to an upper mounting bracket 1322 and includes a convex-up radiused cord support region 1314*a* at a lower region thereof. The convex-up radiused cord support region 1314*a* (FIGS. 14 and 15) slidingly receives a portion of the cord 1312 that is located between the movable bearing component 1316 and an electrical power outlet assembly 1320. The movable weighted radiused bearing component 1316 defines a channel that slidingly receives another portion of the cord 1312 that is located between its entry point 1312*a* into a fixed ceiling-mount bracket 1322 and the fixed bearing component 1314. The fixed ceiling-mount bracket 1322 may be secured to a ceiling surface by fasteners 1324 (FIG. 14), and provides space for an end of the power cord 1312 to be routed toward and connected to a source of electrical power.

The movable bearing component 1316 acts as a cord support or retractor that enables the electrical power outlet assembly 1320 to remain in a static position when no external forces are acting upon the power outlet assembly 1320, the cord 1312, or the movable bearing component 1316. Movable bearing component 1316 may be a weighted or inherently heavy component made of dense material, and formed in the shape of a semi-circular tube that slidably receives the cord 1312. The movable bearing component 1316 counteracts the weight of the electrical outlet assembly 1320 at the free end of the power cord 1312. A user may grasp the movable bearing component 1316 and manually raise or lower it to cause the electrical outlet assembly 1320 to lower or raise, respectively. Alternatively, a user may grasp the electrical outlet assembly 1320 to manually raise or lower it, causing the movable bearing component 1316 to lower or raise, respectively, with the movable bearing component 1316 always remaining at the bottom of a 180-degree loop formed along the cord 1312.

The cord material and radiused bearing components are selected to facilitate sliding movement of the cord 1312 in the bearing components, substantially without abrasion to the cord, but with sufficient friction to hold the outlet assembly at different desired elevations. The shape of the movable bearing component 1316 allows it to be easily grasped by a user and raised or lowered to change the elevation of the outlet assembly, which can also be grasped directly to change its elevation. Thus, the overhead electrical infeed device 1310 of FIGS. 14 and 15 is a pulley-less system that operates similarly to a pulley system, such as will be described below.

Figure 15:
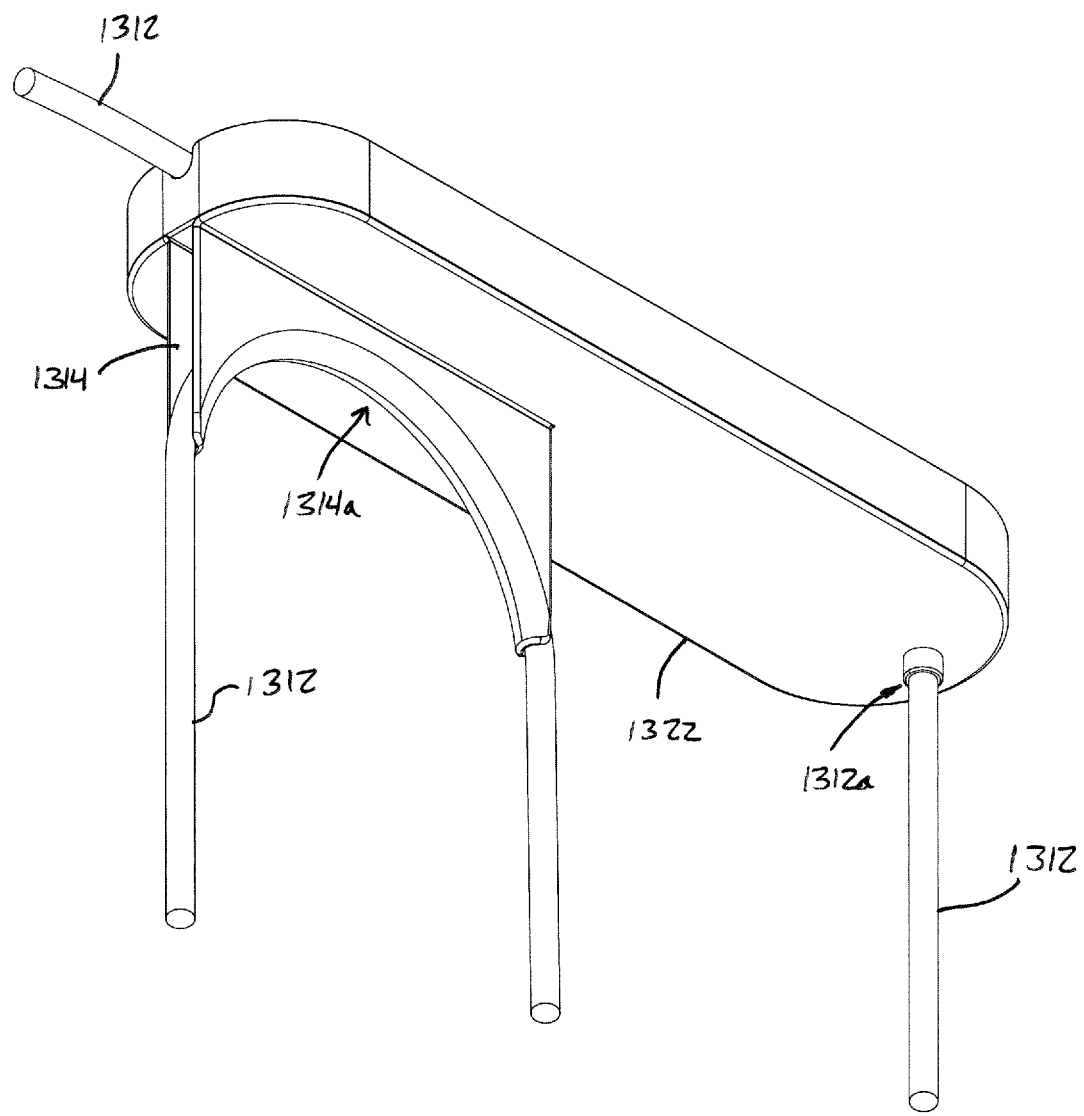
FIG. 15 is an enlarged bottom perspective view of an upper region of the electrical infeed device of FIG. 14.
Figure 16:
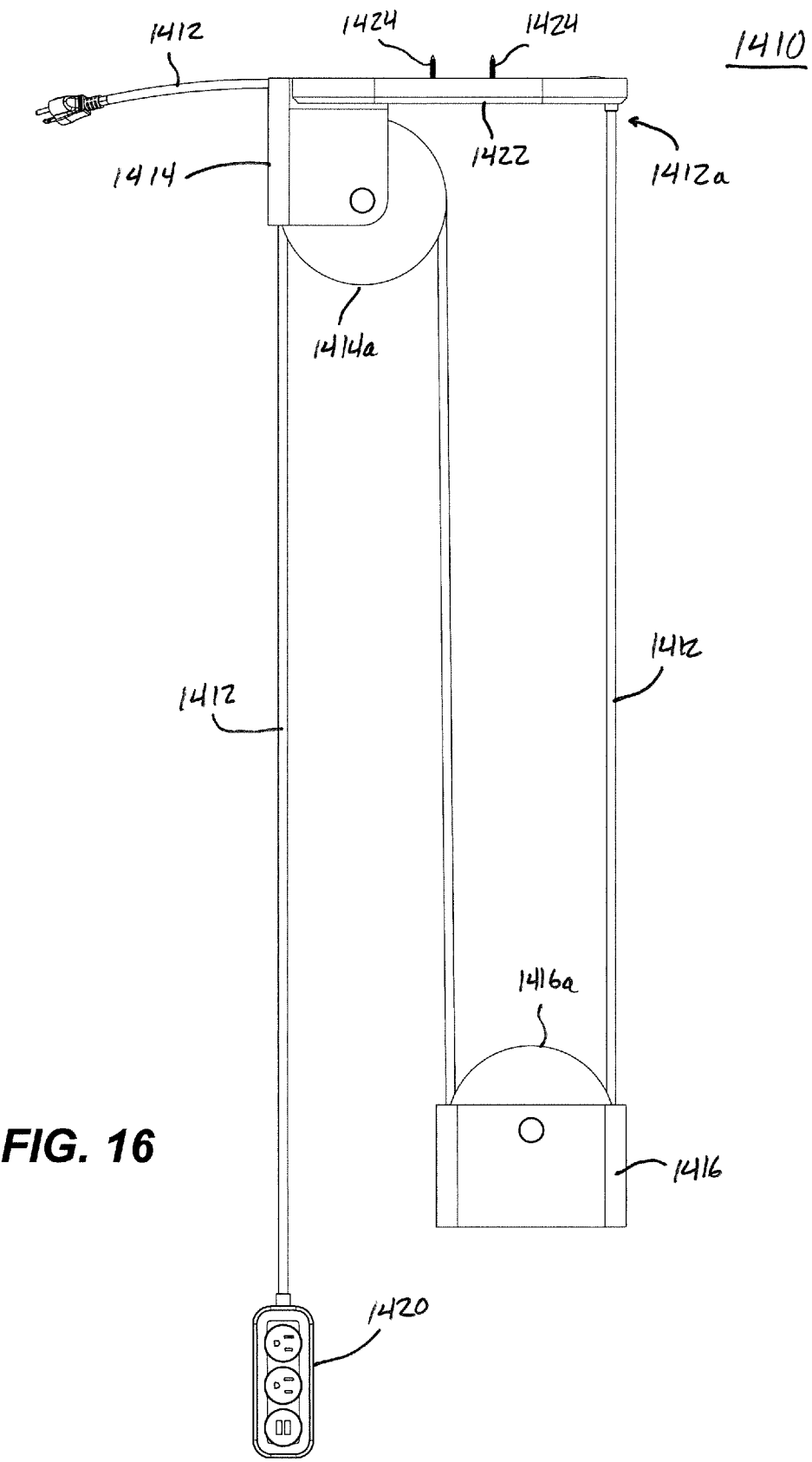
FIG. 16 is a side elevation of another overhead electrical infeed device in accordance with the present invention.
Figure 17:
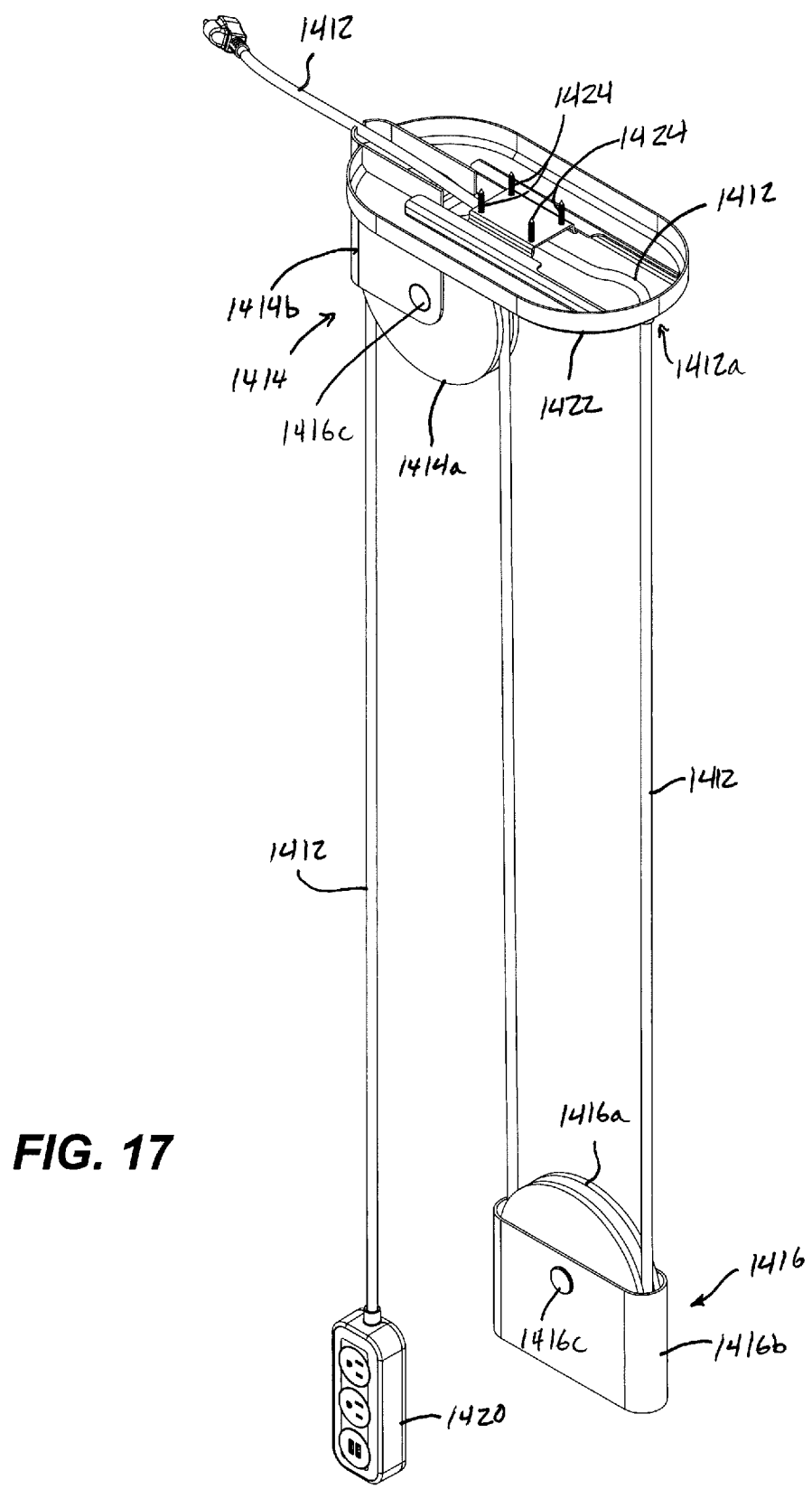
FIG. 17 is a top perspective view of the overhead electrical infeed device of FIG. 16.
Figure 18:
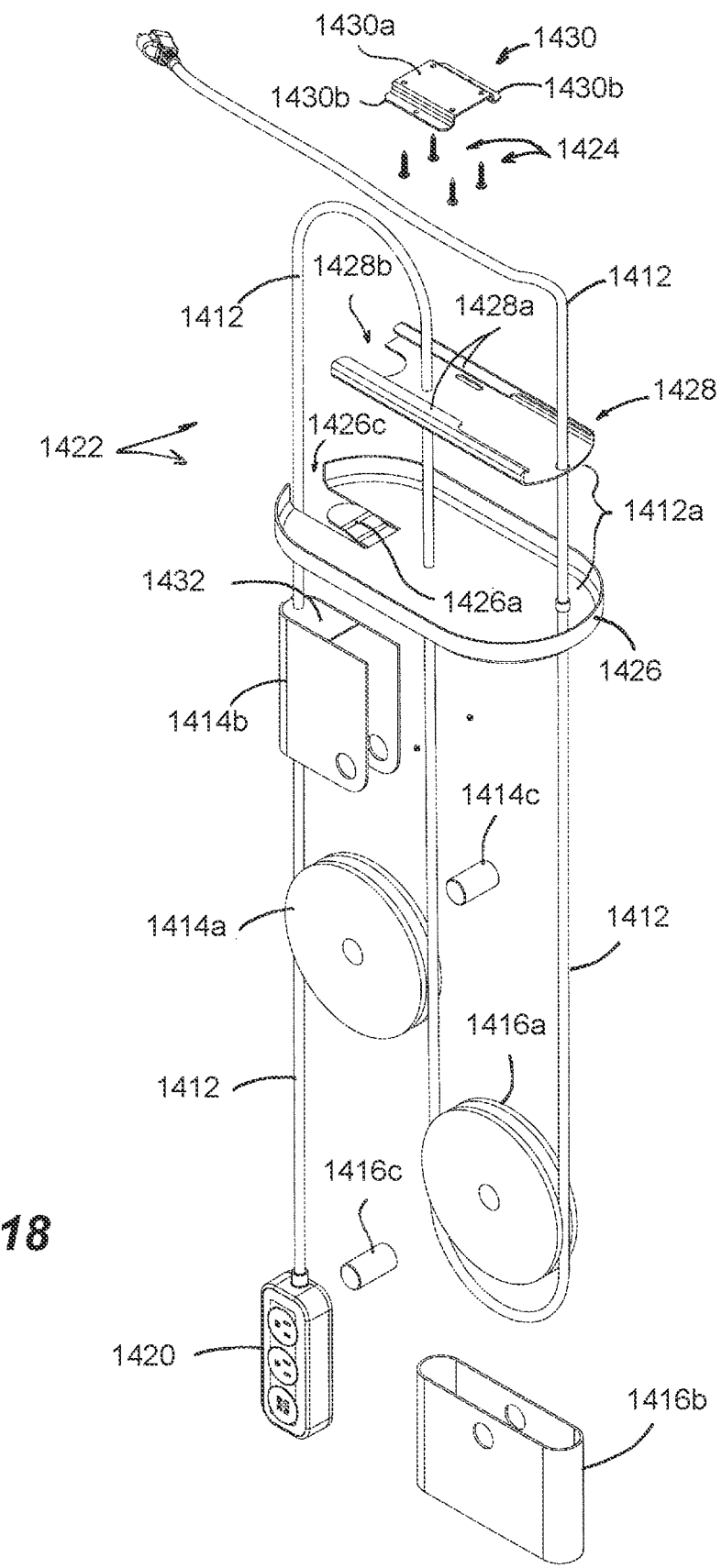
FIG. 18 is an exploded top perspective view of the overhead electrical infeed device of FIG. 16.

FIGS. 16-18 depict overhead electrical infeed device 1410 with an upper mounting bracket 1422 including a pulley system in place of sliding features of the device of FIGS. 14 and 15. In FIGS. 16-18 the overhead electrical infeed device 1410 utilizes a pair of pulley assemblies 1414, 1416 for reduced friction as compared to radiused bearing components 1314, 1316 of FIGS. 14 and 15, and is otherwise configured similarly to the pulley-less system 1310 of FIGS. 14 and 15. Overhead electrical infeed device 1410 includes an electrical cord 1412 routed or reeved around a fixed pulley assembly 1414 and a movable weighted pulley assembly 1416. Fixed pulley assembly 1414 is coupled to an upper mounting bracket 1422 and includes a rotatable pulley 1414*a* coupled to a bracket piece 1414*b* via a spindle or bearing 1414*c*, with a portion of the cord 1412 that is located between the movable pulley assembly 1416 and an electrical power outlet assembly 1420 reeved over a top of the pulley 1414*a*. The movable weighted pulley assembly 1416 includes a rotatable pulley 1416*a* that receives another portion of the cord 1412 that is located between the cord's entry point 1412*a* into the fixed ceiling-mount bracket 1422, and the fixed pulley assembly 1414. The fixed ceiling-mount bracket 1422 may be secured to a ceiling surface by fasteners 1424 (FIG. 14), and provides space for an end of the power cord 1412 to be routed toward and connected to a source of electrical power.

The movable pulley assembly 1416 acts as a cord support or retractor that may permit the electrical power outlet assembly 1420 to remain in a static position when no external forces are acting upon the power outlet assembly 1420, the cord 1412, or the movable pulley assembly 1416. However, the movable pulley assembly 1416 may be sufficiently weighted so that it causes the power outlet assembly 1420 to rise when no external forces are acting upon it. Optionally, a bracket piece 1416b of the movable pulley assembly 1416 may be selected for its weight in order to balance the electrical outlet assembly 1420 in a static position or to cause the electrical outlet assembly 1420 to slowly rise when not in use, depending on the weight of the selected electrical outlet assembly 1420. Thus, the movable pulley assembly 1416 counteracts the weight of the electrical outlet assembly 1420 at the free end of the power cord 1412. A user may grasp the movable pulley assembly 1416 and manually raise or lower it to cause the electrical outlet assembly 1420 to lower or raise, respectively. Alternatively, a user may grasp the electrical outlet assembly 1420 to manually raise or lower it, causing the movable pulley assembly 1416 to lower or raise, respectively, with the movable pulley assembly 1416 always remaining at the bottom of a 180-degree loop formed along the cord 1412.

In FIGS. 17 and 18 there are shown additional structure of the fixed ceiling-mount bracket 1422, which may be substantially identical to the fixed ceiling-mount bracket 1322 of the overhead electrical infeed device 1310 of FIGS. 14 and 15. As best shown in FIG. 18, the bracket 1422 includes a main cover 1426, an inner bracket 1428 that is received in an upper cavity of the main cover 1426, and a ceiling-mount flange plate 1430 that is secured directly to a ceiling surface by the fasteners 1424. The flange plate 1430 is generally shaped as an inverted-U including a central bight region 1430a and a pair of lateral outwardly-directed flanges 1430b spaced below the bight region 1430a. The flange plate's lateral flanges 1430b are slidingly received by a pair of inwardly-directed flanges 1428a of the inner bracket 1428, the inwardly-directed flanges 1428a only extending along a portion of the length of the inner bracket 1428 so that the inner bracket 1428 and the main cover 1426 can together be slidingly engaged with the flange plate 1430, such as shown in FIG. 17.

The inner bracket 1428 further includes an end recess 1428b (FIG. 18) that provides clearance for a spring tab 1426a of the main cover 1426. It should be understood that FIG. 18 does not illustrate the actual path of the cord 1412 relative to the parts of fixed ceiling-mount bracket 1422 and the bracket piece 1414b. As such, the cord 1412 does not pass through the inner bracket 1428 or the main cover 1426 as appears in the exploded view of FIG. 18, except near the cord's entry point 1412a into the fixed ceiling-mount bracket 1422, as shown in FIG. 17. Instead the cord 1412 passes around the fixed-position rotatable pulley 1414a beneath the main cover 1426 and inner bracket 1428 as will be understood with reference to FIG. 16. Spring tab 1426a helps to elevate the cord 1412 after the cord passes through a slot defined between the flange plate 1430 and the inner bracket 1428, such as shown in FIG. 17. Spring tab 1426a may also serve to support the bracket piece 1414b of the fixed pulley assembly 1414 and secure the bracket piece 1414b to the fixed ceiling-mount bracket 1422, such as by engaging a top plate 1432 of the bracket piece 1414b. In this arrangement, the fixed pulley assembly 1414 (with cord 1412 reeved around the pulley 1414a) may be attached to the main cover 1426 by engaging the bracket piece's top plate 1432 over the spring tab 1426a at a slot or recess 1426c formed in the main cover 1426. Optionally, the spring tab 1426a may provide a selective securing/releasing function for the fixed pulley assembly's bracket piece 1414b.

Figure 19:
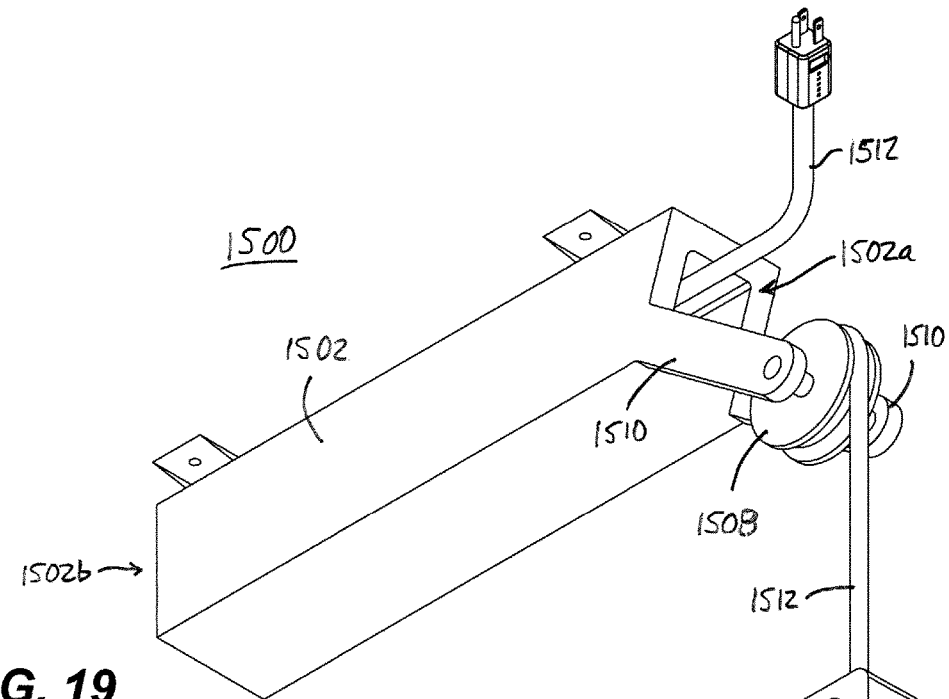
FIG. 19 is a bottom perspective view of another overhead electrical infeed device in accordance with the present invention.
Figure 20:
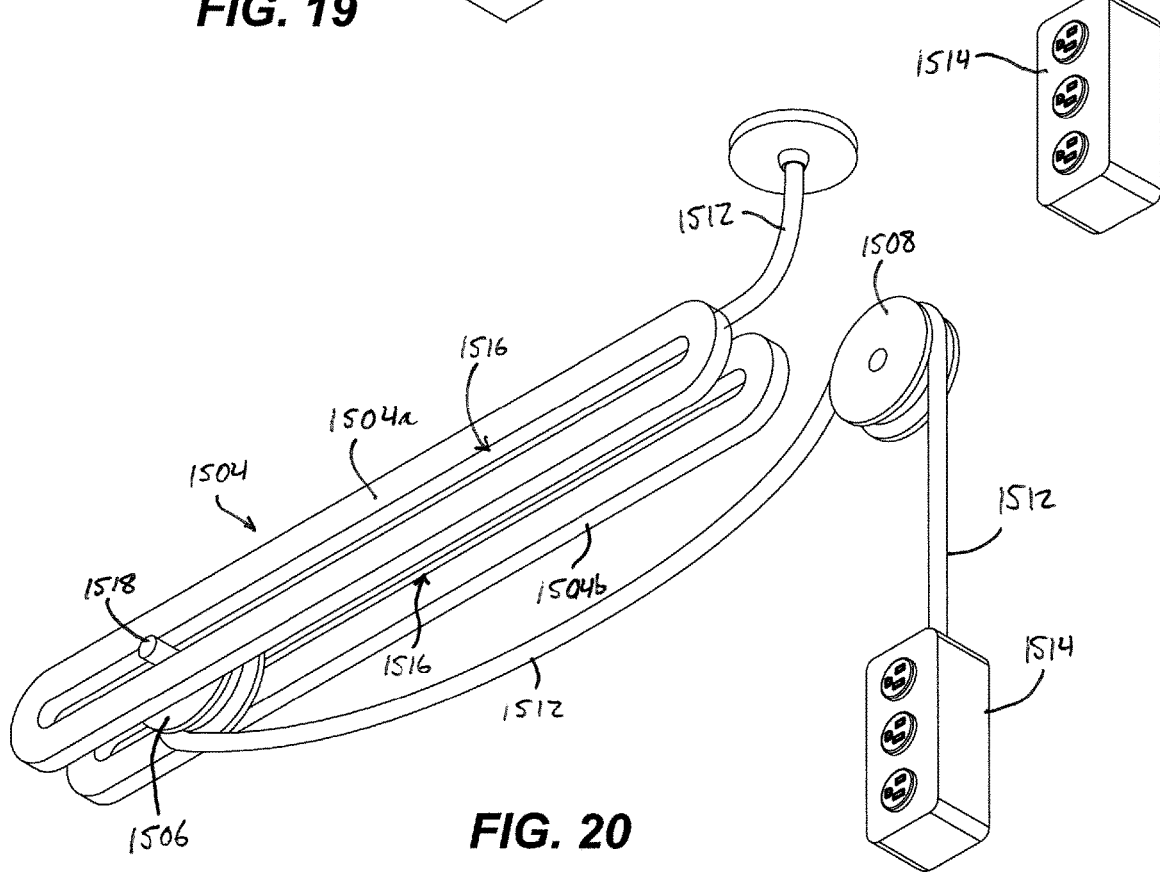
FIG. 20 is a bottom perspective view of the overhead electrical infeed device of FIG. 19, in which an outer housing has been omitted to show internal structure.

FIGS. 19-22 illustrate several overhead electrical infeed devices 1500, 1600, 1700 with horizontal cord retraction arrangements. Referring to FIG. 19, an overhead electrical infeed device 1500 includes a retractor shroud or housing 1502 that encloses a retractor track 1504 and a retractor pulley 1506 (FIG. 20). A fixed pulley 1508 is mounted at the ends of a pair of spaced-apart arms 1510 that extend forwardly and downwardly away from an open front end 1502a of the retractor housing 1502, with a distal end portion of a cord 1512 reeved around the fixed pulley 1508 and down to an electrical outlet assembly 1514. The retractor track 1504 is made up of two elongate track members 1504a, 1504b that define respective elongate slots 1516. The elongate slots 1516 receive respective ends of a spindle 1518 on which the retractor pulley 1506 is rotatably supported, with the spindle 1518 and retractor pulley 1506 permitted to travel together along the track 1504 inside of the retractor housing 1502. A spring or other biasing member urges the retractor pulley 1506 away from the open front end 1502a of the retractor housing 1502, and toward a closed rear end 1502b of the retractor housing. Although the spring or biasing element is not shown in FIG. 19 or 20, it will be appreciated that a biasing element similar to the spring retractors of FIGS. 21 and 22 (described below) may be used. Other options for biasing elements include elastic members, an electric motor, or pneumatic device, any of which may be operable to hold the retractor pulley 1506 in a fixed position, or to retract and raise the outlet assembly 1514 when desired.

Optionally, the track 1504, retractor pulley 1506, and biasing element (not shown) may be unshrouded, such as shown in FIG. 20. In that case, a different support structure such as one or more open brackets will be needed to support the track 1504 and the fixed pulley 1508 in position. It will also be appreciated that a track for supporting the retractor pulley 1506 may be formed directly along interior surfaces of the retractor shroud or housing 1502, obviating the need for separate track members 1504a, 1504b to be inserted and mounted inside the retractor housing 1502.

The force of the biasing member acting upon the retractor pulley 1506 causes the cord 1512, which is reeved around the retractor pulley 1506, to either be drawn into the open end 1502a of the retractor housing 1502 or to be maintained in a static position when no outside forces are applied to the electrical outlet assembly 1514. A user may grasp the electrical outlet assembly 1514 and pull it downwardly from a retracted (raised) position to a lowered in-use position. It will be appreciated that attaching an electrical plug with cord to the electrical outlet assembly 1514 may apply sufficient downward force on the outlet assembly 1514 to maintain the outlet assembly 1514 in the lowered position, whereas disconnecting the plug and cord may allow the outlet assembly 1514 to be slowly raised by the spring or biasing element inside the retractor housing 1502. The spring or biasing element may apply a maximum retraction force when the outlet assembly 1514 is fully lowered, which corresponds to a maximum length (and weight) of cord 1512 extending down from the fixed pulley 1508. Therefore, the amount of downward force that must be applied to the outlet assembly 1514 in order to lower it can be substantially constant along the travel range of the outlet assembly 1514. This is because the retraction force will gradually build as the outlet assembly 1514 is lowered, but the increasing retraction force will be counteracted by increasing weight of the increasing length of cord extending from the fixed pulley 1508 to the outlet assembly 1514. With proper selection of the biasing member for the length and size (or weight-per-length) of the cord, as well as for the weight of the outlet assembly 1514, the overhead electrical infeed device 1500 can maintain the outlet assembly 1514 in substantially any position between fully retracted and fully extended when no outside forces are applied.

Figure 21:
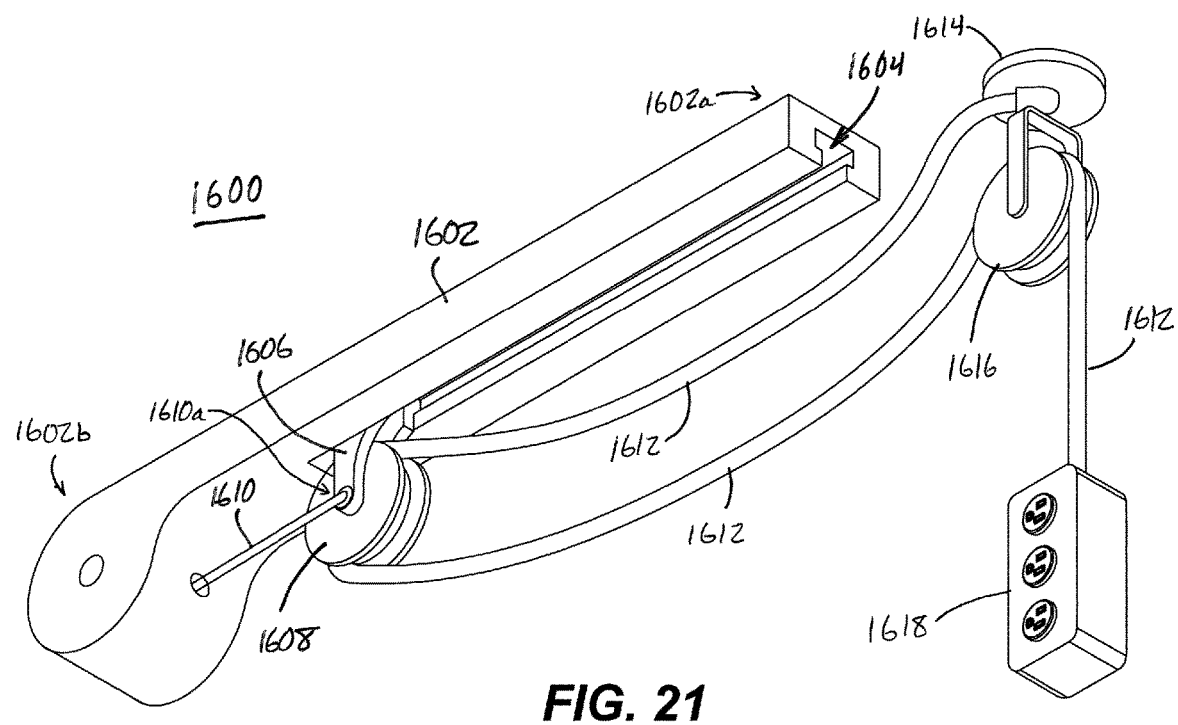
FIG. 21 is a bottom perspective view of another overhead electrical infeed device in accordance with the present invention.
Figure 22:
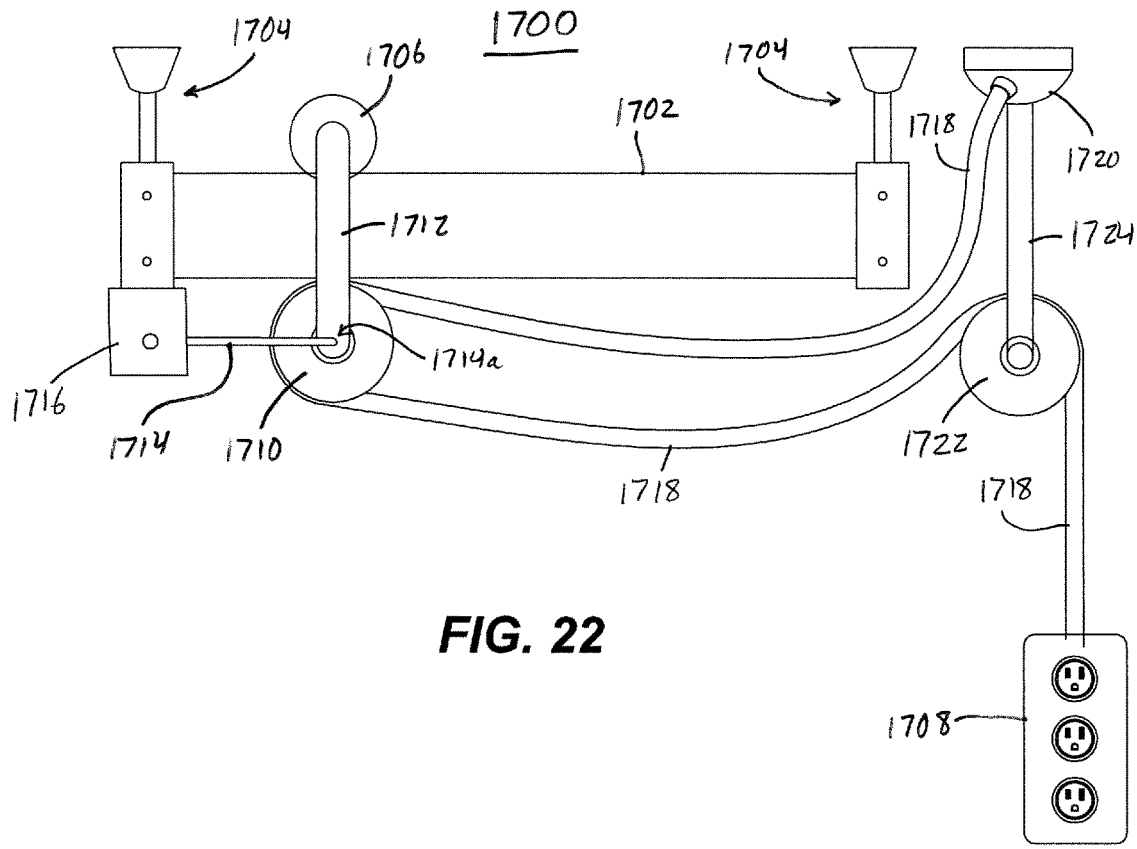
FIG. 22 is a side elevation of another overhead electrical infeed device in accordance with the present invention.

The overhead electrical infeed devices 1600, 1700 of FIGS. 21 and 22 are functionally similar to the overhead electrical infeed device 1500 of FIG. 19. The overhead electrical infeed device 1600 of FIG. 21 utilizes a support track 1602 that is securable to a ceiling surface. The support track 1602 defines an elongate T-shaped channel 1604 that slidably supports a pulley bracket 1606 on which a retractor pulley 1608 is supported below the track 1602. The retractor pulley 1608 is rotatable on the pulley bracket 1606, and is horizontally translatable along the track 1602 from a distal end 1602a to a proximal end 1602b thereof. A retractor cord 1610 has a distal end 1610a coupled to the pulley bracket 1606 and exerts a pulling force toward the proximal end 1602b of the track 1602. A power cord 1612 is connected to a ceiling-mounted electrical power source behind a ceiling plate 1614, extends generally horizontally to the top of the retractor pulley 1608 where it is reeved around and returns forwardly toward the ceiling plate 1614. The cord 1612 is then reeved around the top of a fixed pulley 1616 that is suspended below the ceiling plate 1614, and extends downwardly where it terminates at a power outlet assembly 1618. Depending on the flexibility and weight-per-length of the cord 1612, the position of the retractor pulley 1608, and the weight of the power outlet assembly 1618, the sections of cord extending between the retractor pulley 1608 and the ceiling plate 1614 and fixed pulley 1616 may be expected to sag by varying degrees, such as shown in FIG. 21.

The tension in the retractor cord 1610 is determined by the weight of the power outlet assembly 1618, the weight of the cord extending from the fixed pulley 1616 to the outlet assembly 1618, and any outside forces applied to the outlet assembly 1618. In substantially the same manner discussed above with respect to the biasing element of the electrical infeed device 1500, the retraction forces of the biasing element that is housed at the proximal end portion 1602b of the track 1602 can be selected according to the weight of the outlet assembly and the weight-per-length of the power cord 1612, in order to balance or counteract the weight of the outlet assembly 1618.

Referring to FIG. 22, the overhead electrical infeed device 1700 includes a support track 1702 that is securable to a ceiling surface with a pair of brackets 1704. The support track 1702 may be a simple beam having a top surface on which a support pulley 1706 rolls back and forth in response to a power outlet assembly 1708 being raised and lowered by a user. The support pulley 1706 is connected to a retractor pulley 1710 spaced below the support track 1702 by a pulley link 1712. A retractor cord 1714 has a distal end 1714a coupled to the lower end of the pulley link 1712 and exerts a pulling force toward a spring retractor 1716 at a proximal end of the track 1702. A power cord 1718 is connected to a ceiling-mounted electrical power source behind a ceiling plate 1720, extends downwardly and then generally horizontally to the top of the retractor pulley 1710 where it is reeved around and returns forwardly toward the ceiling plate 1720. The cord 1718 is then reeved around the top of a fixed pulley 1722 that is suspended below the ceiling plate 1720 by a pulley hanger 1724, and extends downwardly where it terminates at the power outlet assembly 1708. Horizontal travel of the retractor pulley 1710 along the track 1702 is limited by the brackets 1704 at opposite ends of the track, or may be further limited by the length of the retractor cord 1714. The various other operating characteristics and design choices (such as biasing force of the retractor 1716) will be substantially the same as for the overhead electrical infeed devices 1500, 1600, and may be readily understood with reference to the above descriptions.

Figure 23A:
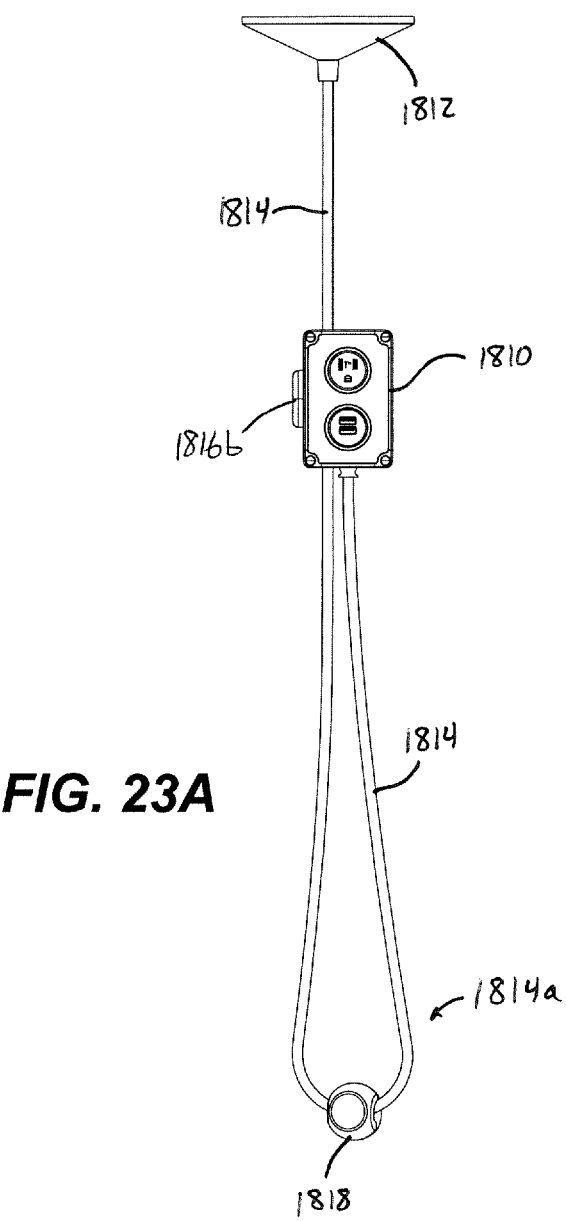
FIG. 23A is a side elevation of another overhead electrical infeed device in accordance with the present invention, shown in a raised configuration.
Figure 23B:
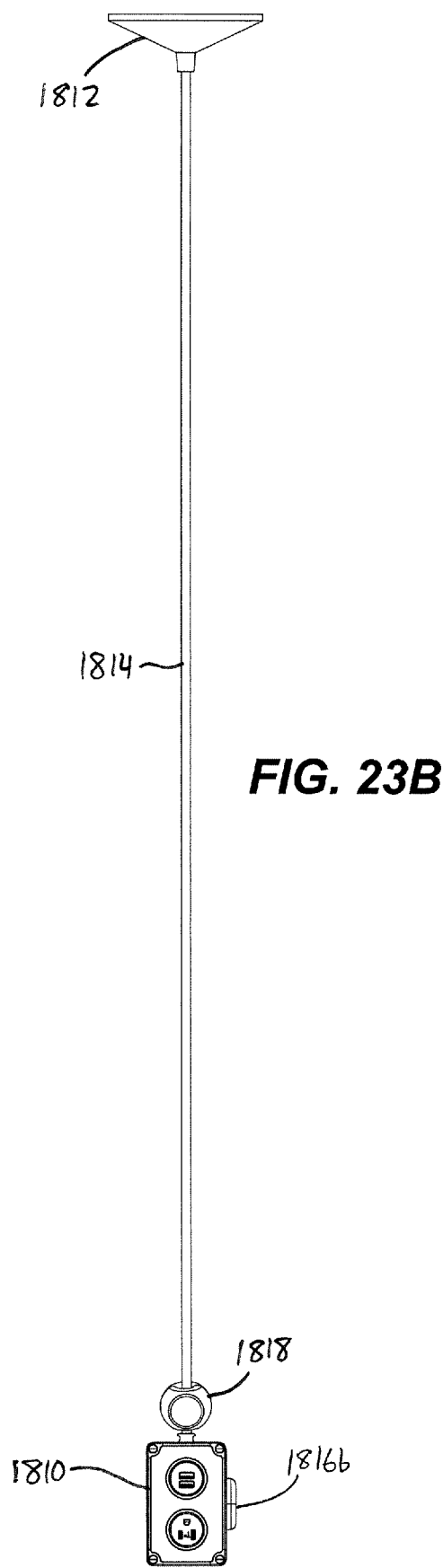
FIG. 23B is another side elevation of the overhead electrical infeed device of FIG. 23A, shown in a lowered configuration.
Figure 24:
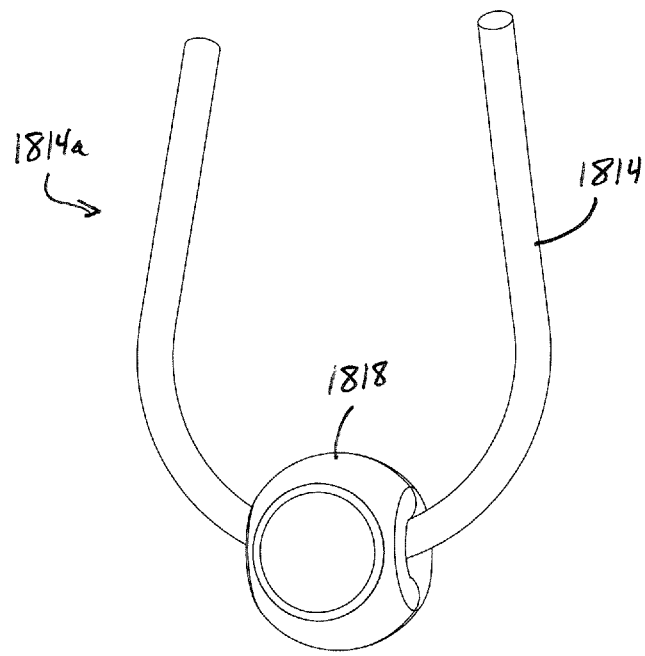
FIG. 24 is an enlarged view of a portion of the overhead electrical infeed device of FIG. 23A.
Figure 25:
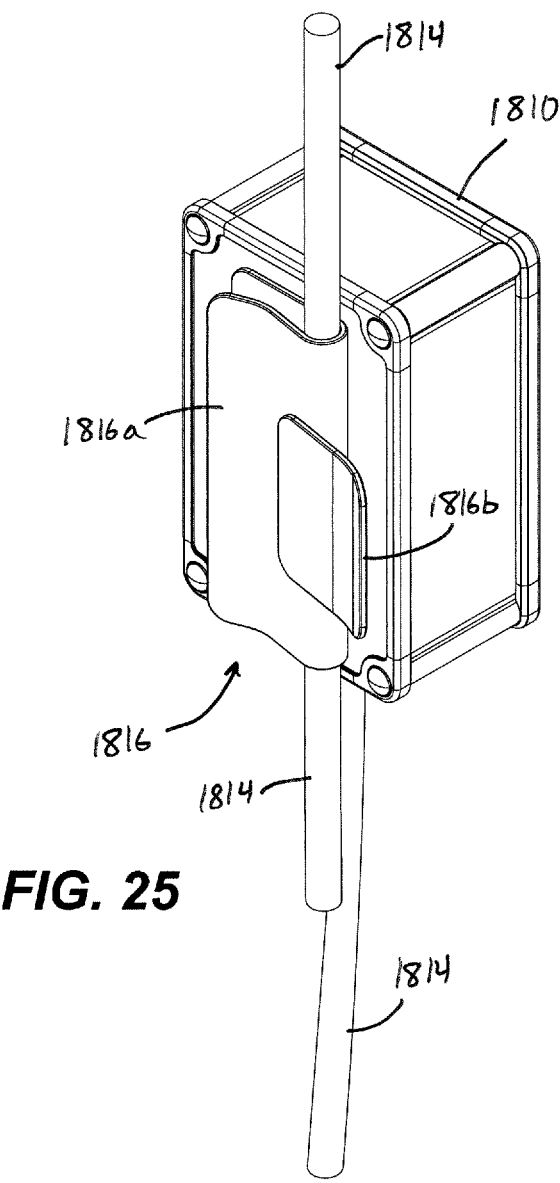
FIG. 25 is an enlarged rear perspective view of an outlet assembly of the overhead electrical infeed device of FIGS. 23A and 23B.

Referring now to FIGS. 23A and 23B, an electrical outlet assembly 1810 can be lowered to hang freely below an overhead mount 1812 as shown in FIG. 23B. The outlet assembly 1810 can also be friction-clipped to its own power cord 1814 with a rear clip 1816 (FIGS. 23A and 25) that includes a resilient cord-engaging portion 1816a and a manual release tab 1816b. The manual release tab 1816b can be pressed toward a rear surface of the outlet assembly 1810 to open the cord-engaging portion 1816a and thereby permit the cord 1814 to slide through the cord-engaging portion 1816a, or to permit the cord 1814 to be entirely removed from the cord-engaging portion 1816a. A generally spherical grasping ball 1818 is slidably mounted along the cord 1814, and provides a convenient grasping surface that allows a user to pull down on the ball 1818 to lower the outlet assembly 1810. This can be accomplished when the ball 1818 is disposed along a loop region 1814a that can be formed in the cord 206 below the outlet assembly 1810 (FIGS. 23A and 24) when the housing is frictionally clipped to an intermediate portion of the cord 1814. An interior surface of the ball 1818, which defines a bore through which the cord 1814 may pass, may be lined with a low friction material to facilitate the cord 1814 sliding through the ball 1818 when the ball is pulled downwardly. It will be appreciated that the spring force of the resilient cord-engaging portion 1816a of the rear clip 1816 impinging on the cord 1814 at the rear of the power outlet assembly 1810 will also affect the amount of downward force required on the ball 1818 to cause the power outlet assembly 1810 to slide downwardly along the cord 1814.

Figures 26A, 26B:
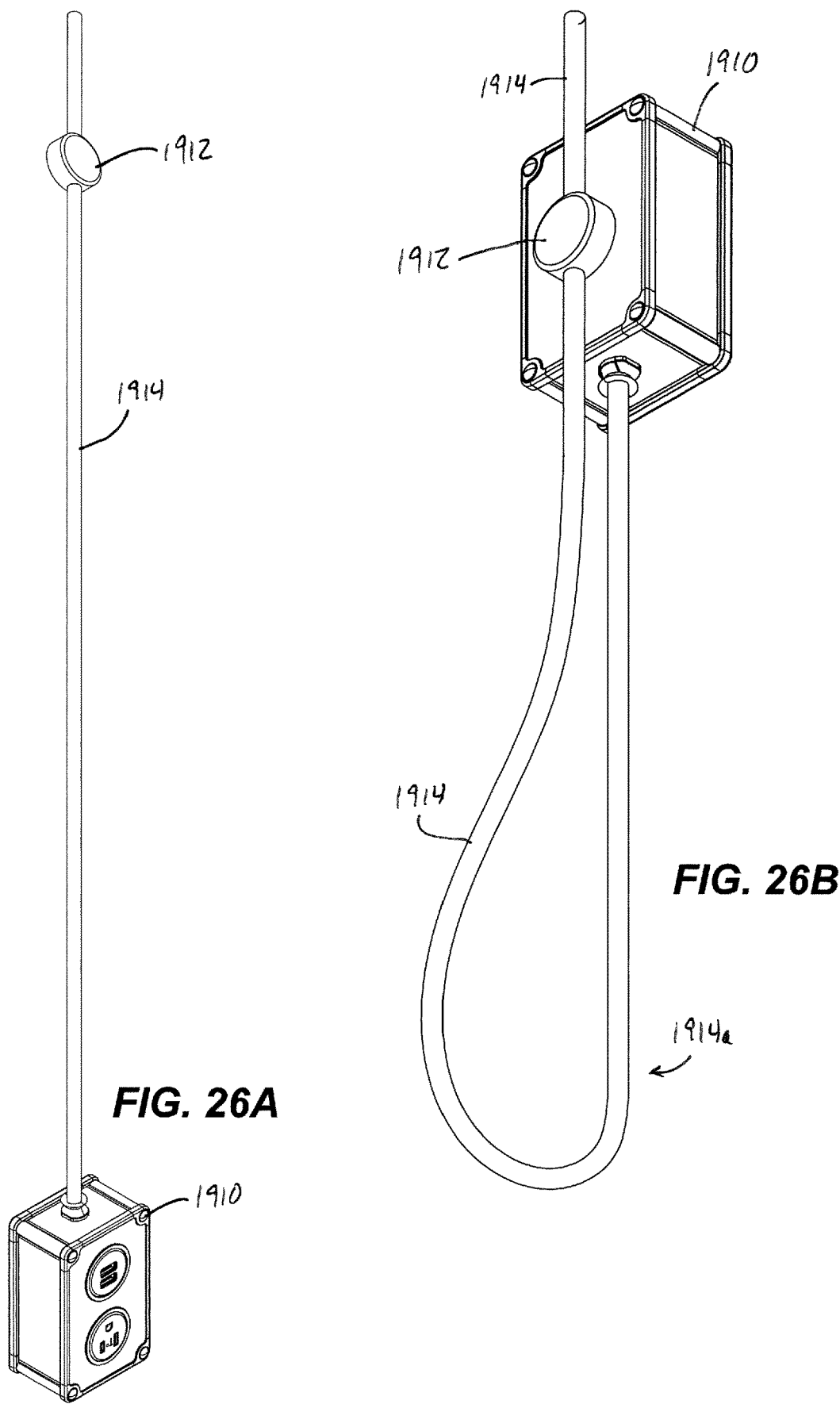
FIG. 26A is a side perspective view of another overhead electrical infeed device in accordance with the present invention, shown in a lowered configuration.
FIG. 26B is another side perspective view of the overhead electrical infeed device of FIG. 26A, shown in a raised configuration.

FIGS. 26A and 26B illustrate a power outlet assembly 1910 that is at least partially made of magnetically permeable material, such as steel, such that the assembly 1910 can be releasably attached to a magnetic slide 1912 that is frictionally disposed along a power cord 1914. Magnetic slide 1912 can be manually slid along the cord 1914 to different heights or elevations according to a user's preference, and the outlet assembly 1910 then attached to it and held in place along the cord 1914 by friction and the magnetic field generated by the slide 1912. Optionally, the magnetic attractive force of the magnetic slide 1912 to the outlet assembly 1910 may be sufficiently strong, and the frictional engagement of the magnetic slide 1912 along the cord 1914 may be sufficiently low, that a user pulling directly on the outlet assembly 1910 or pulling down on a cord loop 1914a below the outlet assembly 1910 (with or without the aid of a grasping ball like the ball 1818 described above), will cause the outlet assembly 1910 and the magnetic slide 1912 to slide downwardly together along the cord 1914, lowering the outlet assembly 1910 until the loop 1914a has been all but fully taken up. Otherwise, if the frictional engagement of the magnetic slide 1912 along the cord 1914 is sufficiently strong to overcome the attractive force of the magnetic slide 1912 to the outlet assembly 1910, a user pulling down on the cord loop 1914a or pulling directly on the outlet assembly may cause the outlet assembly 1910 to separate from the magnetic slide 1912 before the magnetic slide 1912 will slide down the cord 1914. Optionally, the force required to move the magnetic slide 1912 away from the outlet assembly 1910 may be increased by forming a detent recess in a rear surface of the outlet assembly 1910, the detent recess sized and shaped correspondingly to the magnetic slide 1912. Further, a friction adjustment mechanism such as a threaded fastener may be provided at the magnetic slide 1912, to allow a user to increase or decrease the sliding resistance of the magnetic slide 1912 along the cord 1914.

Figure 27:
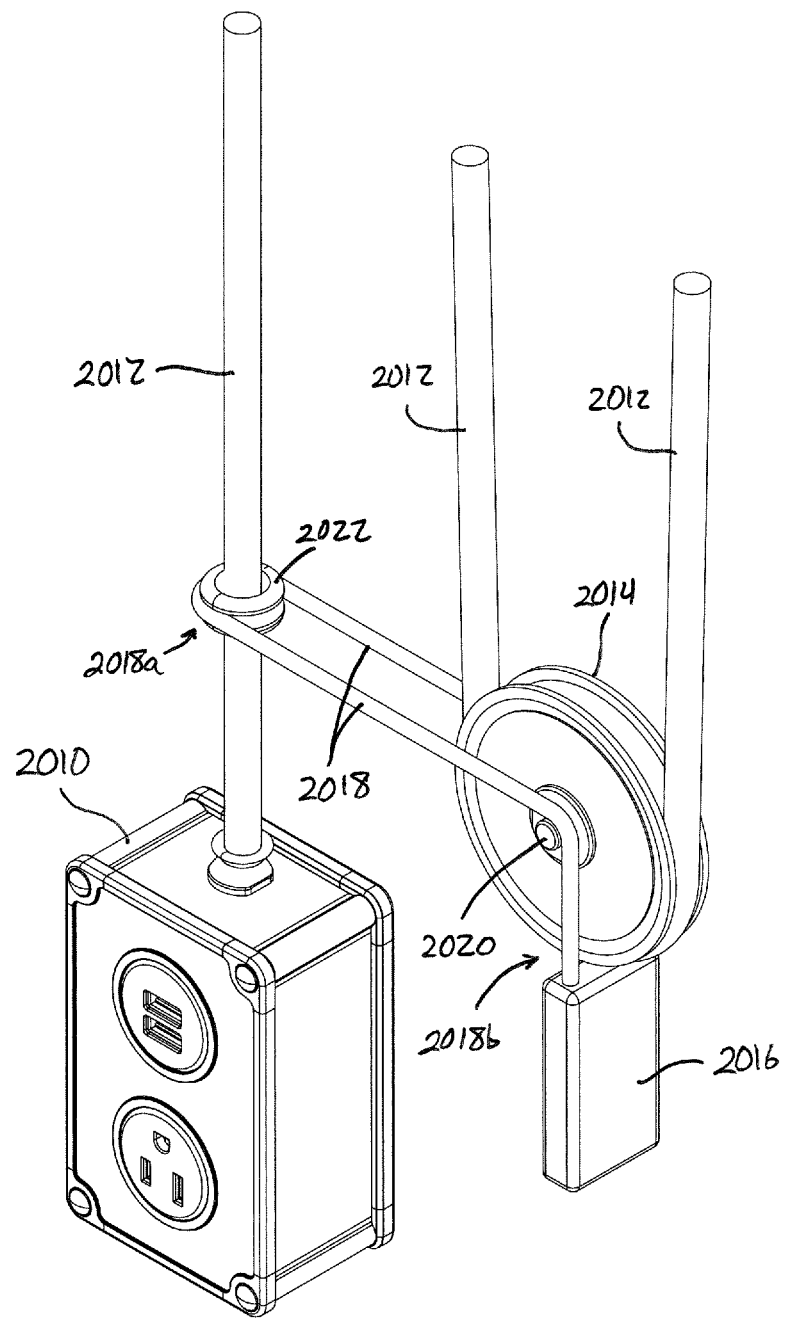
FIG. 27 is a side perspective view of a lower region of another overhead electrical infeed device in accordance with the present invention.
Figure 28:
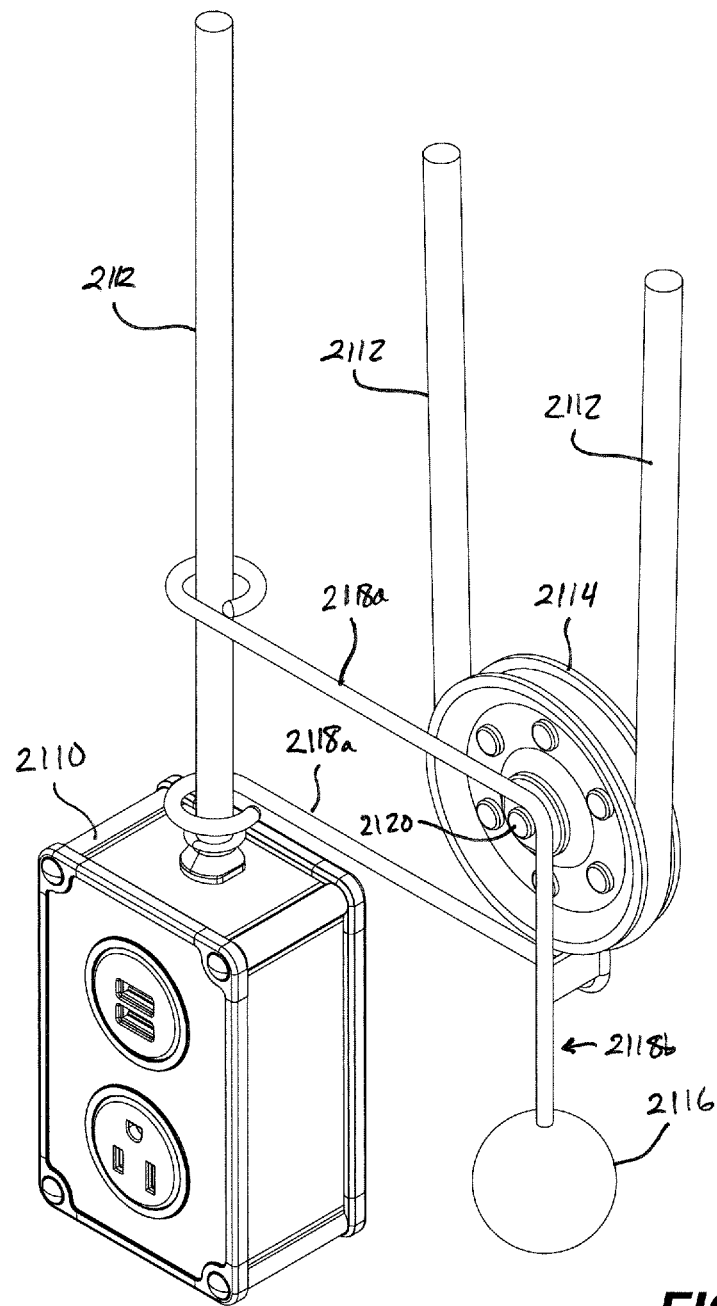
FIG. 28 is a side perspective view of a lower region of another overhead electrical infeed device in accordance with the present invention.
Figure 29:
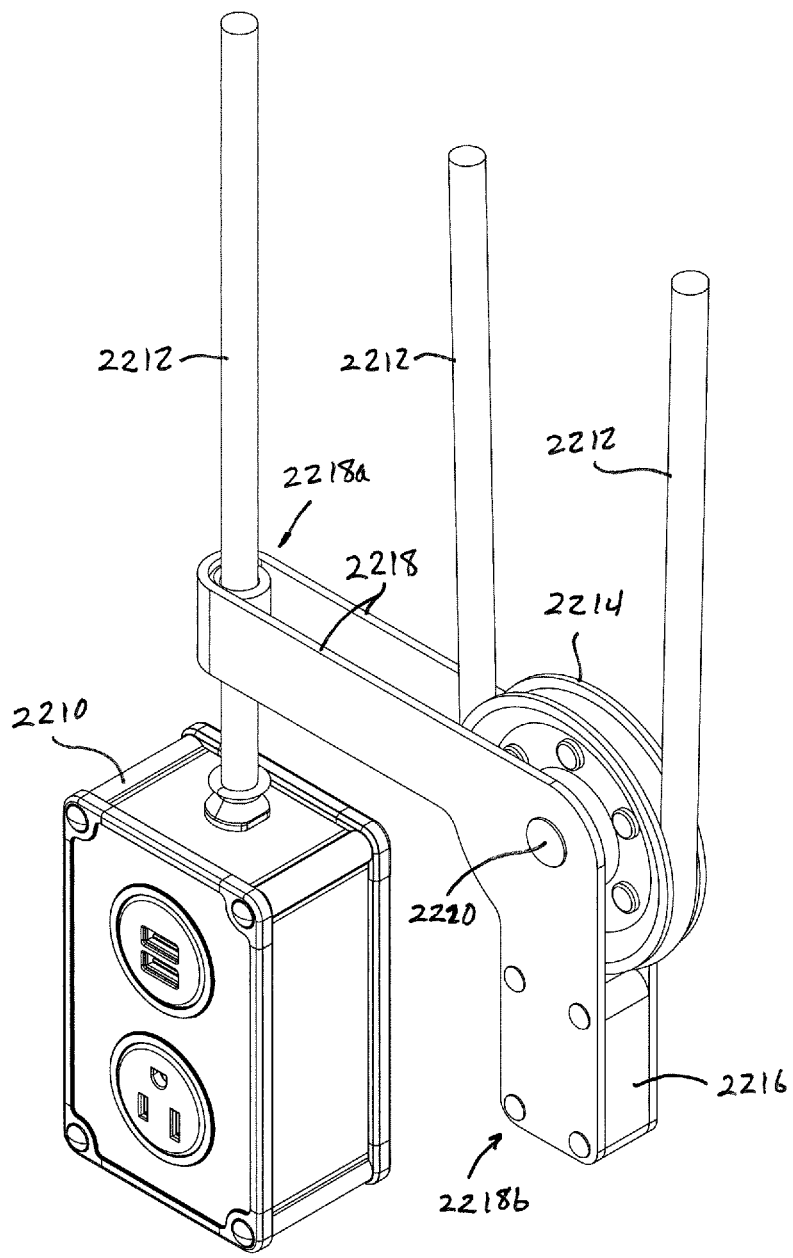
FIG. 29 is a side perspective view of a lower region of another overhead electrical infeed device in accordance with the present invention.

FIGS. 27-29 illustrate variations of the overhead electrical infeed device 1410 of FIGS. 16-18, in which different movable weighted pulley assemblies include stabilizing arms that engage the power cord section directly above the electrical power outlet. Referring to FIG. 27, a perspective view of a lower region of an overhead electrical infeed device, an electrical outlet assembly 2010 is suspended at the free end of a cord 2012. The 2012 cord extends upwardly and over a fixed pulley of the type described above with reference to FIG. 16, and then down to a movable lower pulley 2014 that has a weight 2016 to help counterbalance the weight of outlet assembly 2010. A horizontal bracket or stabilizing arm 2018 extends from an axle 2020 of the movable lower pulley 2014 to the section of cord 2012 that is directly above the outlet assembly 2010. The bracket arm 2018 includes a loop end 2018a that turns 180-degrees around the cord 2012 and is fitted with a grommet or bushing 2022. Loop end 2018a and bushing 2022 help to reduce swaying and limits the maximum height or elevation to which the housing 2010 can be raised. Counterweight 2016 is coupled to a downwardly-extending end 2018b of the bracket arm 2018, and may be detachably coupled to permit exchanging for lighter or heavier counterweights according to the weight of the selected power outlet assembly 2010 and the amount of retraction (outlet-raising) force desired.

The embodiments of FIGS. 28 and 29 are minor variations of the embodiment of FIG. 27. For example, in FIG. 28 there is shown a lower region of another overhead electrical infeed device in which an electrical outlet assembly 2110 is suspended at the free end of a cord 2112. A dual horizontal bracket arm 2118 has a pair of vertically-spaced horizontal legs 2118a that each loop around the cord 2112 and are joined by a vertical leg 2118b that extends down from an axle 2120 of the movable lower pulley 2114 to a counterweight 2116. The counterweight 2116 may have a threaded bore for attachment to a threaded lower region of the vertical leg 2118b, to facilitate exchanging for lighter or heavier counterweights as desired.

In FIG. 29 there is shown a lower region of another overhead electrical infeed device in which an electrical outlet assembly 2210 is suspended at the free end of a cord 2212. A horizontal bracket arm 2218 extends from an axle 2220 of the movable lower pulley 2214 to the section of cord 2212 that is directly above the outlet assembly 2210. The bracket arm 2218 includes a loop end 2218a that turns 180-degrees around the cord 2212 and is fitted with a grommet or bushing 2222. A counterweight 2216 is coupled to a downwardly-extending end 2218b of the bracket arm 2218 by a plurality of fasteners 2224. The fasteners 2224 are optionally removable to permit exchanging the counterweight 2216 for lighter or heavier counterweights as desired.

Figure 30:
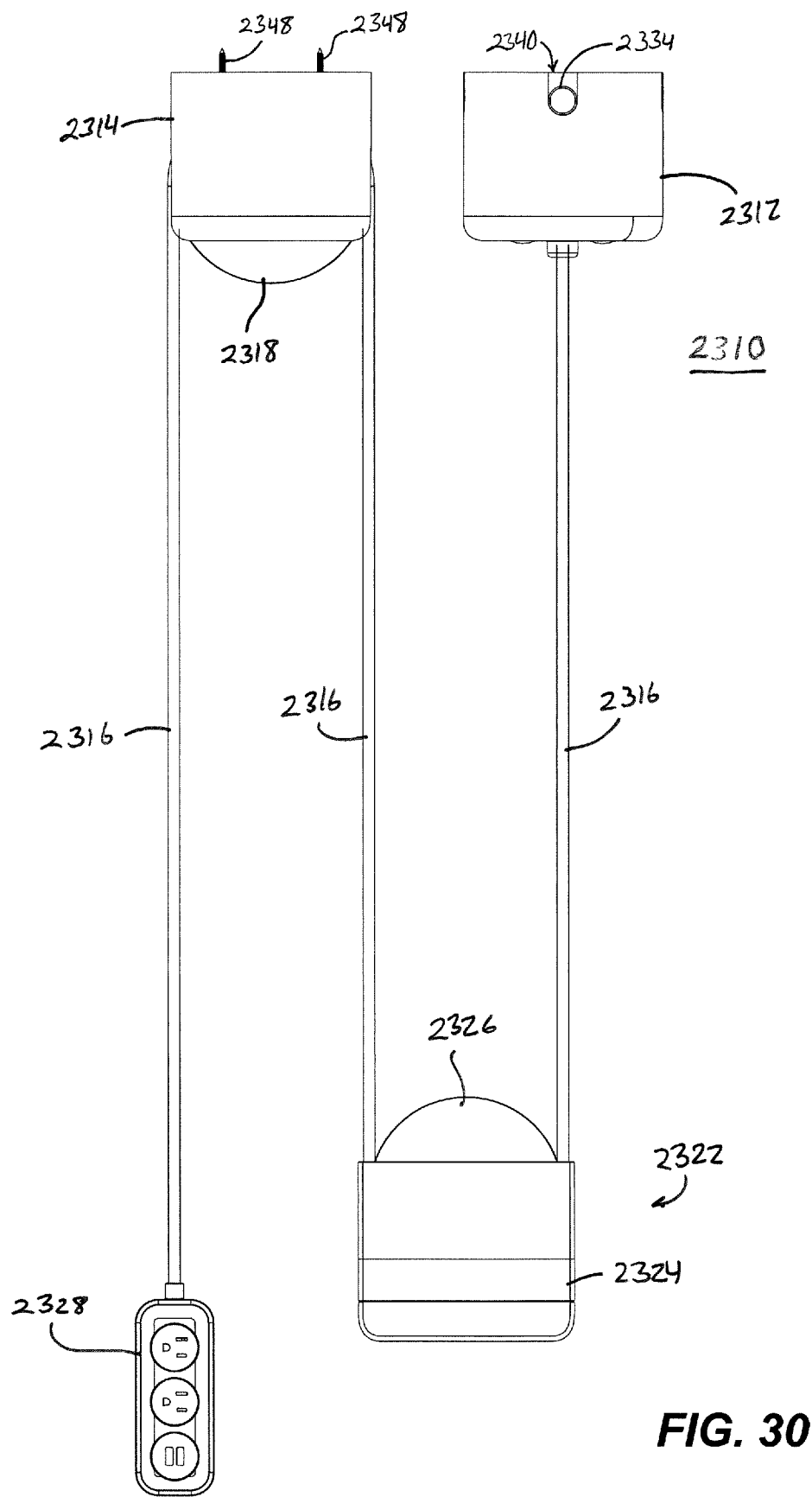
FIG. 30 is a side elevation of another overhead electrical infeed device in accordance with the present invention.
Figure 31:
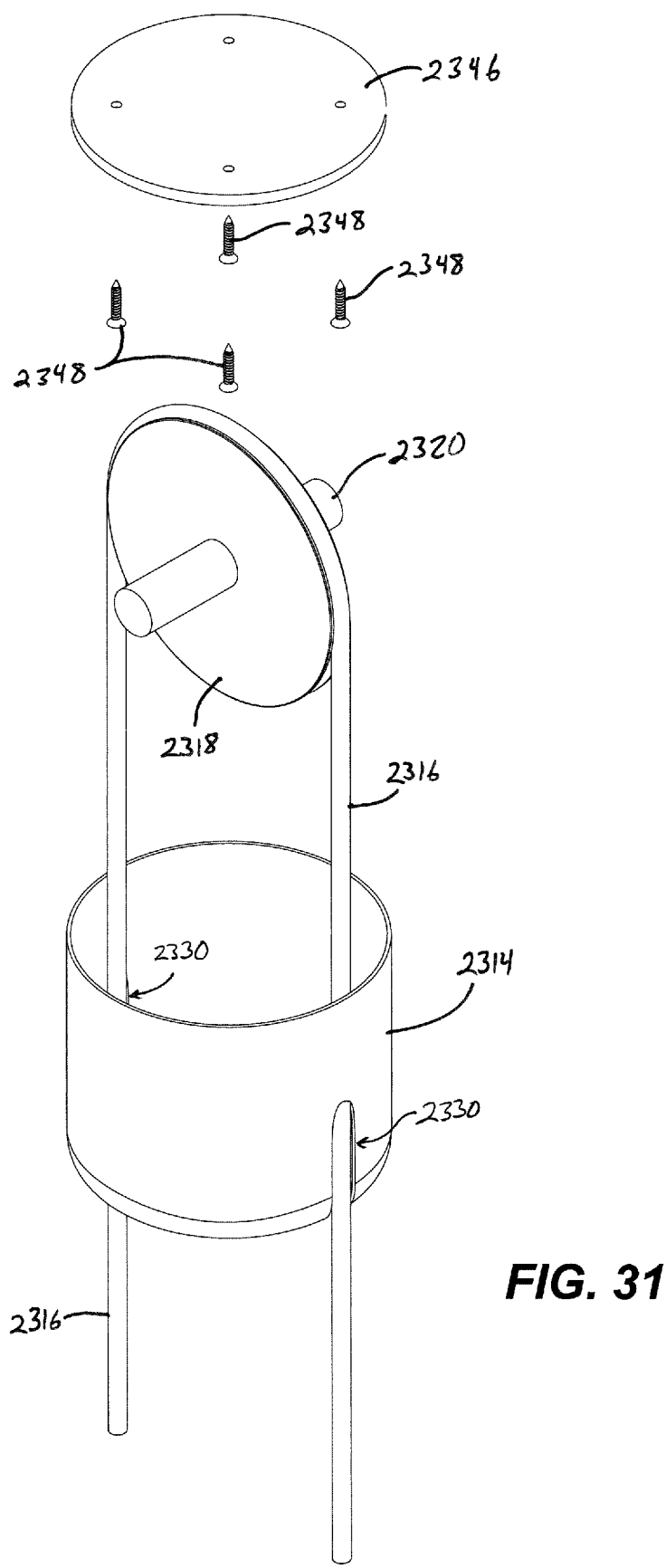
FIG. 31 is an exploded perspective view of an upper pulley and shroud of the overhead electrical infeed device of FIG. 30.
Figure 32:
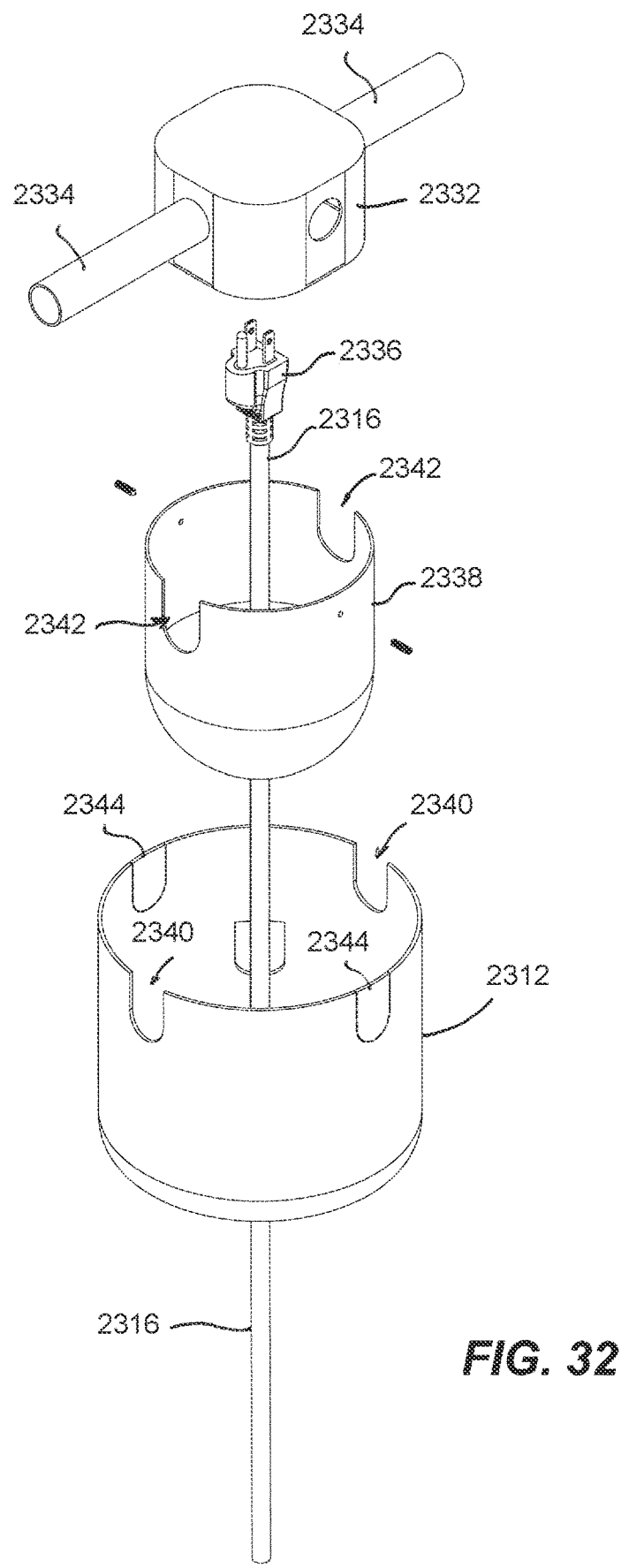
FIG. 32 is an exploded perspective view of an electrical box, conduit, and shroud of the overhead electrical infeed device of FIG. 30.

FIGS. 30-32 illustrate another overhead electrical infeed device 2310 that is similar to the device 1410 embodiment of FIG. 16-18, but with two separate and spaced-apart ceiling-mounted housings 2312, 2314. A power connection housing 2312 surrounds a fixed upper mount and power connection for a cord 2316, such as shown in FIGS. 30 and 32. A fixed pulley housing 2314 surrounds the upper region of a fixed pulley 2318 and engages a spindle 2320 for the fixed pulley 2318, such as shown in FIGS. 30 and 31. A movable weighted pulley assembly 2322 includes a shroud 2324 that surrounds a lower end of a movable pulley 2326, and that engages a spindle (not shown) of the movable pulley 2326. An electrical power outlet assembly 2328 is suspended from a distal end of the cord 2316, which is reeved over the fixed pulley 2318 and through the fixed pulley housing 2314. The fixed pulley housing 2314 defines a pair of slots 2330 (FIG. 31) through which the cord 2316 passes. After passing over the fixed pulley 2328, the cord 2316 extends down to the movable weighted pulley assembly 2322 where it is reeved below and around the movable pulley 2326 and back up to the power connection housing 2312 where the cord 2316 connects to a power source.

The power connection housing 2312 contains an electrical box 2332 with conduits 2334 for routing electrical wiring to an electrical receptacle or splice connections (not shown) that supply power to the conductors of the electrical cord 2316, which may be fitted with a conventional plug 2336 as shown, or which may terminate in bare wire. An inner shroud 2338 is sized and shaped to pass around the outer walls of the electrical box 2332 to close a bottom opening of the electrical box 2332 while providing clearance for the plug 2336 to extend below the electrical box 2332. However, it will be appreciated that a more conventional bottom cover may be used for the electrical box 2332, particularly if splice connections are used instead of the plug 2336. The power connection housing 2312 and inner shroud 2338 both have respective upper recesses 2340, 2342 that allow the upper portions of the housing 2312 and shroud 2338 to pass around the conduits 2334 for a cleaner appearance. Two knockout pieces 2344 are shown at the power connection 2312 housing, where two additional upper recesses could be formed, if desired. The power connection housing 2312 and/or conduits 2334 may be attached to ceiling structure in any conventional manner. Referring again to FIG. 31, a top plate 2346 encloses the fixed pulley 2318 inside the fixed pulley housing 2314, while threaded fasteners 2348 may be used to secure the top plate 2346 to a ceiling surface, thereby securing the fixed pulley 2318 in a horizontally spaced arrangement from the power connection housing 231, such as shown in FIG. 30.

Figure 33:
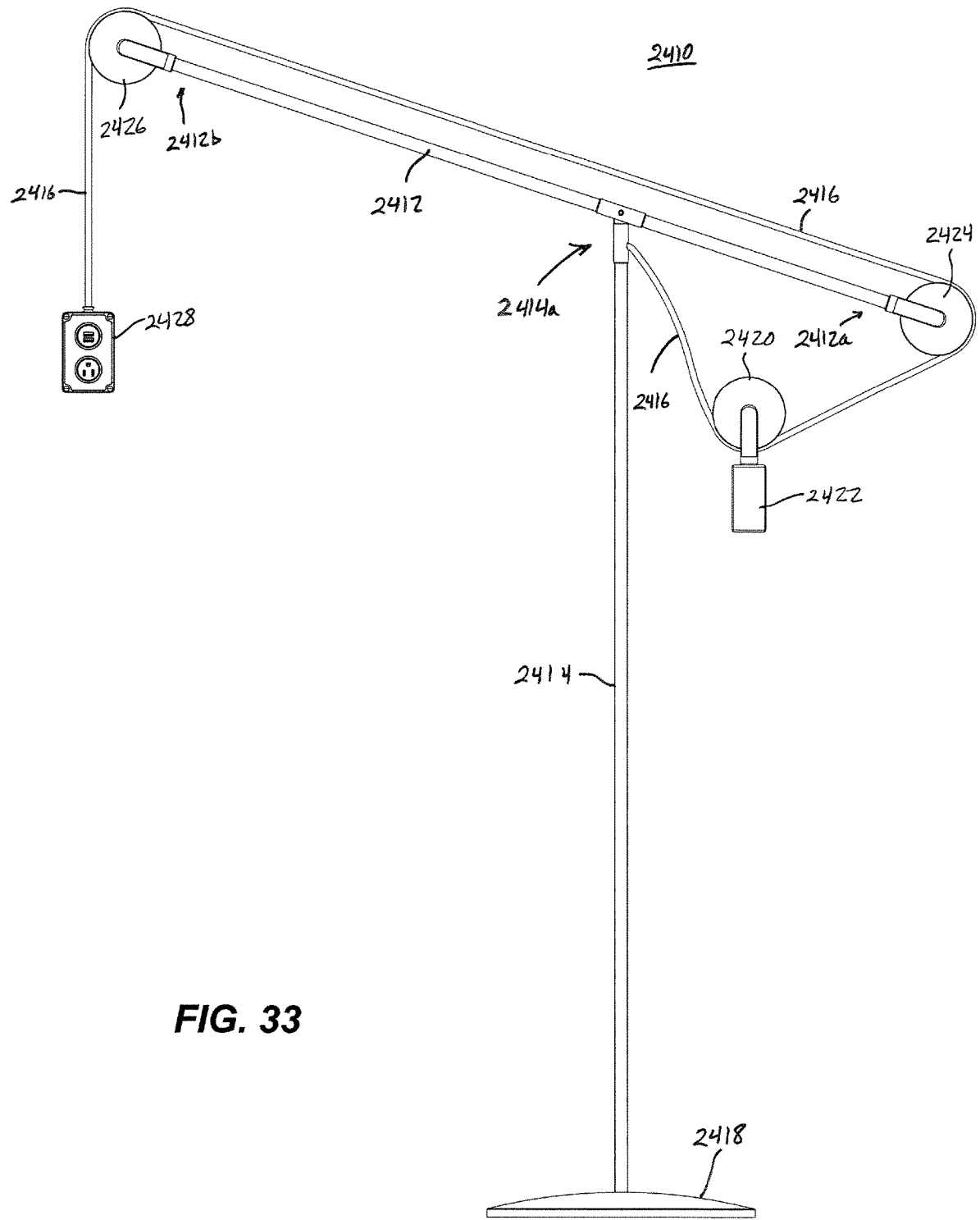
FIG. 33 is a side perspective view of a floor-supported overhead electrical infeed device in accordance with the present invention.

Turning now to FIG. 33, a freestanding overhead or elevated electrical infeed device 2410 includes a pivotable support arm 2412 that is fixed to an upper end 2414a of an upright support tube 2414. A power cord 2416 extends from a power source (not shown) into a base 2418 of the infeed device 2410 and up through the upright support tube 2414, exiting the support tube 2414 at the upper end 2414a. From the support tube 2414, the power cord 2416 extends rearwardly to a movable pulley 2420 from which a weight 2422 is hung. The power cord 2416 is reeved around the lower surface of the movable pulley 2420, and then extends further rearwardly to a rear support arm pulley 2424 at a rear end 2412a of the support arm 2412. After being reeved around the rear support arm pulley 2424, the cord 2416 extends forwardly along and above the support arm 2412 to a forward support arm pulley 2426 at a forward end 2412b of the support arm 2412. The cord 2416 is then reeved over the top of the forward support arm pulley 2426 and down to an electrical power outlet assembly 2428, which suspended from the cord 2416.

The movable pulley 2420 and its weight 2422 are free to move along the cord 2416 in the cord region between the upright support tube 2414 and the rear support arm pulley 2424. Vertical adjustment of the electrical outlet assembly 2428 may be accomplished by grasping pulling the assembly 2428 down, which raises the movable pulley 2420 and its counterweight 2422, or by lifting the assembly 2428 to allow the movable pulley 2420 and its counterweight 2422 to drop. In the alternative, the movable pulley 2420 and its counterweight 2422 can be grasped and then raised and lowered to cause the outlet assembly 2428 to lower or rise, respectively. The pivotable support arm 2412 can be tilted as desired to further adjust the height of the outlet assembly 2428 above a floor surface upon which the base 2418 is supported. As in the other embodiments described above, the weight 2422 may be selected to balance or overcome the weight of the outlet assembly 2428, as desired.

Thus, the overhead electrical infeed systems of the present invention provide various arrangements and mechanisms for providing convenient overhead access to electrical power for users of a work area, living space, or substantially any enclosed or partially-enclosed area having overhead support structure capable of supporting electrical wiring. Various embodiments may permit a power outlet assembly of the system to be retained at a desired lowered position for convenient access by a user, and allow the user to easily raise the power outlet assembly to an elevated position by simply grasping and moving the power outlet assembly to a desired elevation. Thus, users with portable electrical devices such as tools or appliances, or portable electronic devices such as mobile phones and computers, may be provided with convenient access to electrical power at overhead locations.

Changes and modifications in the specifically-described embodiments may be carried out without departing from the principles of the present invention, which is intended to be limited only by the scope of the appended claims as interpreted according to the principles of patent law including the doctrine of equivalents.

The embodiments of the invention in which an exclusive property or privilege is claimed are defined as follows:

1. An overhead electrical infeed system comprising:
   an overhead mount comprising a cord securement portion and a cord movement portion;
   an electrical cord comprising:
      a proximal end portion fixedly mounted to said cord securement portion of said overhead mount;
      a free distal end portion spaced from said proximal end portion; and
      an intermediate portion disposed between said proximal end portion and said free distal end portion, said intermediate portion comprising a first region that is movably engaged with said cord movement portion of said overhead mount, and a second region disposed between said first region and said proximal end portion;
   an electrical outlet assembly coupled to and suspended from said free distal end portion of said electrical cord; and
   a retractor comprising a cord-engaging member movably disposed along said second region of said intermediate portion of said electrical cord, wherein said retractor is configured to counterbalance said electrical outlet assembly by maintaining said electrical outlet assembly at a selected elevation below said overhead mount or by raising said electrical outlet assembly relative to said overhead mount.

2. The overhead electrical infeed system of claim 1, further comprising an electrical outlet supported at said electrical outlet assembly and configured to provide electrical power or electronic data to an electrical or electronic device.

3. The overhead electrical infeed system of claim 2, wherein said electrical outlet comprises at least one chosen from a high voltage AC receptacle and a low voltage DC receptacle.

4. The overhead electrical infeed system of claim 1, wherein said cord-engaging member of said retractor comprises a pulley.

5. The overhead electrical infeed system of claim 4, wherein said retractor comprises a counterweight removably coupled to said pulley, and wherein said counterweight is replaceable with a different counterweight to change an overall weight of said retractor.

6. The overhead electrical infeed system of claim 4, further comprising a stabilizing arm extending laterally from said pulley, said stabilizing arm having a distal end disposed around said free distal end portion of said electrical cord above said electrical outlet assembly.

7. The overhead electrical infeed system of claim 1, wherein said cord-engaging member of said retractor comprises an arcuate tube disposed around said second region of said intermediate portion of said electrical cord.

8. The overhead electrical infeed system of claim 1, wherein said cord movement portion of said overhead mount comprises a convex-up arcuate bearing surface that is slidably engaged by said first region of said intermediate portion of said electrical cord.

9. The overhead electrical infeed system of claim 1, wherein said cord movement portion of said overhead mount comprises a fixed pulley over which is reeved said first region of said intermediate portion of said electrical cord.

10. The overhead electrical infeed system of claim 1, wherein said overhead mount comprises a two-piece mount including a power connection housing comprising said cord securement portion, and a fixed pulley housing comprising said cord movement portion.

11. An overhead electrical infeed system comprising:
    an overhead mount comprising a cord securement portion and a cord movement portion;
    an electrical cord comprising:
       a proximal end portion fixedly mounted to said cord securement portion of said overhead mount;
       a free distal end portion spaced from said proximal end portion; and
       an intermediate portion disposed between said proximal end portion and said free distal end portion, said intermediate portion comprising a first region that is movably supported at said cord movement portion of said overhead mount, and a second region disposed between said first region and said proximal end portion;
    an electrical outlet assembly coupled to and suspended from said free distal end portion of said electrical cord; and
    a counterbalancer movably supported along said second region of said intermediate portion of said electrical cord;
    wherein a weight of said counterbalancer and frictional resistance to movement of said electrical cord at said cord movement portion and at said counterbalancer cooperate to support said electrical outlet assembly at a selected fixed elevation below said overhead mount.

12. The overhead electrical infeed system of claim 11, wherein said electrical outlet assembly is repositionable to different selected fixed elevations by applying and releasing an external raising or lowering force to either or both of said counterbalancer and said electrical outlet assembly.

13. The overhead electrical infeed system of claim 11, wherein said cord movement portion of said overhead mount comprises a first pulley over which said first region of said cord is reeved, and wherein said cord-engaging member of said retractor comprises a second pulley under which said second region of said cord is reeved.

14. The overhead electrical infeed system of claim 13, wherein said counterbalancer comprises a counterweight removably coupled to said second pulley, and wherein said counterweight is replaceable with a different counterweight to change an overall weight of said counterbalancer.

15. The overhead electrical infeed system of claim 13, further comprising a stabilizing arm extending laterally from said second pulley, said stabilizing arm having a distal end disposed around said free distal end portion of said electrical cord above said electrical outlet assembly.

16. The overhead electrical infeed system of claim 11, wherein said counterbalancer comprises an arcuate tube disposed around and slidably engaging said second region of said electrical cord, and said cord movement portion of said overhead mount comprises an arcuate bearing surface that is slidably engaged by said first region of said electrical cord.

17. The overhead electrical infeed system of claim 16, wherein said arcuate tube comprises a convex-down shape and said arcuate bearing surface comprises a convex-up shape.

18. The overhead electrical infeed system of claim 11, wherein said overhead mount comprises a two-piece mount including a power connection housing comprising said cord securement portion, and a fixed pulley housing comprising said cord movement portion.

19. The overhead electrical infeed system of claim 11, wherein said electrical outlet assembly comprises at least one chosen from a high voltage AC receptacle and a low voltage DC receptacle.

\* \* \* \* \*